(12) United States Patent
Ju et al.

(10) Patent No.: US 9,130,927 B2
(45) Date of Patent: Sep. 8, 2015

(54) SINGLE CERTIFICATE SERVICE SYSTEM AND OPERATIONAL METHOD THEREOF

(71) Applicant: SK PLANET CO., LTD., Seongnam-si, Gyeonggi-do (KR)

(72) Inventors: Jaeyoung Ju, Gunpo-si (KR); Kyungwan Ko, Seoul (KR); Bongsu Um, Seoul (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/348,730

(22) PCT Filed: Jul. 2, 2013

(86) PCT No.: PCT/KR2013/005859
§ 371 (c)(1),
(2) Date: Mar. 31, 2014

(87) PCT Pub. No.: WO2014/007516
PCT Pub. Date: Jan. 9, 2014

(65) Prior Publication Data
US 2014/0282983 A1 Sep. 18, 2014

(30) Foreign Application Priority Data
Jul. 2, 2012 (KR) .................. 10-2012-0071623
Jul. 2, 2012 (KR) .................. 10-2012-0071624

(51) Int. Cl.
*H04L 29/06* (2006.01)
*G06F 21/00* (2013.01)
*H04W 12/06* (2009.01)

(52) U.S. Cl.
CPC ........ *H04L 63/0815* (2013.01); *H04L 63/0823* (2013.01); *H04W 12/06* (2013.01)

(58) Field of Classification Search
CPC H04L 63/0815; H04L 63/0823; H04W 12/06
See application file for complete search history.

(56) References Cited

U.S. PATENT DOCUMENTS

2011/0083169 A1* 4/2011 Moeller et al. .................... 726/5
2011/0264913 A1 10/2011 Nikander et al.
2013/0290719 A1* 10/2013 Kaler et al. .................. 713/168
2014/0282983 A1* 9/2014 Ju et al. ............................ 726/8

FOREIGN PATENT DOCUMENTS

KR 1020090102924 A 10/2009
KR 1020100066907 A 6/2010
WO 2011063014 A1 5/2011

OTHER PUBLICATIONS

International Search Report mailed Oct. 28, 2013 for PCT/KR2013/005859.

* cited by examiner

*Primary Examiner* — Lisa Lewis
(74) *Attorney, Agent, or Firm* — Lowe Hauptman & Ham, LLP

(57) ABSTRACT

The present invention discloses a single sign-on service system and its respective elements, and an operating method thereof. The single sign-on service system includes a terminal configured to access at least one of a plurality of application service servers according to a request for activating at least one of a plurality of applications, and receive a service token used to operate the application service from each application service servers on the basis of a single sign-on token without separately inputting sign-on information, an application service servers configured to provide data for operating the application service by the terminal having the service token and when a single sign-on message is received, provide the single sign-on message to a single sign-on service servers.

13 Claims, 12 Drawing Sheets

SINGLE CERTIFICATE SERVICE SYSTEM AND OPERATIONAL METHOD THEREOF

CROSS REFERENCE TO RELATED APPLICATION

This application claims the priority of Korean Patent Application No. 10-2012-0071623, filed on Jul. 2, 2012 and No. 10-2012-0071624, filed on Jul. 2, 2012 in the KIPO (Korean Intellectual Property Office). Further, this application is the National Phase application of International Application No. PCT/KR2013/005859 filed Jul. 2, 2013, which designates the United States and was published in Korean.

TECHNICAL FIELD

The present invention relates to single sign-on of a terminal, and more particularly, to a single sign-on service system for operating a single sign-on of a plurality of applications operated by a terminal, and an operating method thereof.

BACKGROUND ART

As communication terminals are manufactured to have a portable size, the communication terminals are used in a variety of fields due to their easy availability and portability. Recently, these communication terminals have developed into smartphones equipped with a variety of user functions, and thus can provide convenience and entertainment.

Along with the wide use of smartphones, users are using a variety of user functions, especially a variety of smartphone-based communication services. For example, typical users use chatting services with their smartphone, use specific web services, or use services for exchanging emails with others. In this case, a user operates a variety of smartphone-based applications to use a specific communication service. However, in order to use a specific communication service provided by each application, the user should perform a sign-on to a service server that supports operation of the corresponding application, to receive a confirmation that the user is a rightful user to acquire use authority. The sign-on is necessary for each smartphone user to secure and use a normal communication service.

However the sign-on may often cause the user inconvenience. For more detailed description, in order to use a specific application-based communication service, the user should communicate sign-on information with each service server, and thus perform the sign-on. In this case, unfortunately, the sign-on may force the user to repetitively input sign-on information under an inconvenient input condition when there are increasingly various kinds of applications or when a user should input the sign-on information in a limited screen state. Furthermore, when the sign-on information is differently set for each application, a user should input the sign-on information for each application. In this case, when the user cannot remember the sign-on information correctly, the user should input incorrect sign-on information and thus perform an additional correction procedure. Frequently, this inconvenience causes many users to stop using a specific terminal-based communication service.

DISCLOSURE

Technical Problem

The present invention is directed to providing a single sign-on service system and an operating method thereof, which allow applications to be collectively signed onto and thus support easy and simple operation of specific communication services and assurance of appropriate security.

Technical Solution

One aspect of the present invention provides a single sign-on service system including: a terminal configured to access at least one of a plurality of application service servers according to a request for activating at least one of a plurality of applications, and receive a service token used to operate the application service from each application service server on the basis of a single sign-on token without separately inputting sign-on information; an application service server configured to provide data for operating the application service by the terminal having the service token and when a single sign-on message is received, provide the single sign-on message to a single sign-on service server; and a single sign-on service server configured to provide information for operating the single sign-on service by the terminal to the application service server, or to the terminal through the application service server when the single sign-on message is received from the application service server.

Another aspect of the present invention provides an application service server capable of supporting a single sign-on service, the application service server including: a first communication interface configured to receive integration ID login information or a single sign-on token-based session inquiry message from a specific application of a terminal; a first storage configured to store data for supporting a specific application function of the terminal and a service token for operating the specific application function of the terminal; and a first controller configured to deliver a message for creating a single sign-on token to a single sign-on service server when the integration ID login information is received from the specific application, and when the session inquiry message is received, transmit the session inquiry message to the single sign-on service server, receive an integration service number associated with the session inquiry message from the single sign-on service server, and then provide the service token to the specific application of the terminal without separately checking sign-on information of the application.

The first controller may control delivery of a message corresponding to the integration ID login information or a message corresponding to the session inquiry message to the single sign-on service server, and when a single sign-on token and a one-time access key for acquiring single sign-on cookie information by the web browser are received from the single sign-on service server, the first controller control delivery of the single sign-on token and the one-time access key to the application of the terminal.

When the integration ID login information is received, the first controller may control creation of the service token on the basis of the single sign-on token provided by the single sign-on service server and provide the single sign-on token, the service token, and the application function support data to the specific application of the terminal, and when a service token termination request message is received from the specific application of the terminal, the first controller may control provision of a service token termination response message for logging out from the application service of the terminal.

When the integration ID login information is received, the first controller may control creation of the service token on the basis of the single sign-on token provided by the single sign-on service server and provide the single sign-on token, a one-time access key, the service token, and the application function support data to the specific application of the terminal, and when the session inquiry message is received, the first controller may control creation of the service token on the basis of the integration service token provided by the single sign-on service server and provision of the service token to the specific application of the terminal.

When a service token termination request message is received from the specific application of the terminal, the first controller may control provision of a service token termination response message for logging out of the application service to the terminal.

When the service token and a single sign-on token termination request message is received from the specific application of the terminal, the first controller may control provision of the token termination request message to the single sign-on service server, and when a response message corresponding to the token termination request message is received, the first controller may control provision of the service token and the single sign-on token termination response message to the terminal.

When a web browser completion or web browser-based single sign-on cookie termination request message is received, the first controller may control provision of the web browser completion or web browser-based single sign-on cookie termination request message to the single sign-on service server and provision of a response message corresponding to the request message to the terminal.

Still another aspect of the present invention provides a single sign-on service server including: a device communication interface configured to establish a communication channel with at least one application service server and receive a single sign-on session request message and a single sign-on session examination message transmitted by a specific application of a terminal through the application service server; a second storage configured to store a single sign-on token provided to the terminal to support a single sign-on allowing an access to a specific application service server without separately inputting sign-on information; and a second controller configured to control provision of the single sign-on token to the terminal through the application service server when the single sign-on session request message is received, and when the single sign-on session examination message is received, provision of a single sign-on token-based integration service number to the application service server.

When a single sign-on token termination request message is received from the application service server, the second controller may control provision of a response message corresponding to the single sign-on token termination to the application service server.

When a single sign-on session request message is received for creating single sign-on cookie information to be provided to a web browser of the terminal, the second controller may control provision of a single sign-on token and a one-time access key corresponding to the single sign-on session request message to the terminal through the application service, and provision of the single sign-on cookie information to the web browser performing access through the one-time access key.

The second controller may control deletion of the one-time access key after the web browser performs access on the basis of the one-time access key.

When an application single sign-on message composed by using single sign-on cookie information provided by the web browser of the terminal is received, the second controller may control provision of an integration service number corresponding to the application single sign-on message to the application service server, and when a single sign-on cookie termination message is received from the web browser of the terminal, provision of a response message corresponding to the single sign-on cookie termination request message to the web browser and deletion of the single sign-on cookie information stored in the second storage.

Yet another aspect of the present invention provides a terminal capable of supporting a single sign-on service, the terminal including: a communication interface configured to establish a communication channel with at least one of a plurality of application service servers to perform a function of at least one of a plurality of applications; a storage configured to store the plurality of applications, service tokens for using services of the plurality of application service servers, a single sign-on token for supporting access of the plurality of application service servers; and a controller configured to, if there is no single sign-on token, control provision of a single sign-on token acquisition request message to a single sign-on service server through the application service server and acquisition of the single sign-on token, and if there is the single sign-on token, control provision of a single sign-on session inquiry message for providing an integration service number used to access and use of a specific application service server on the basis of the single sign-on token, to the single sign-on service server through the application service server.

The terminal may further include a display unit configured to output at least one of: a region for inputting general sign-on information to access the application service server; a region for performing an integration ID login to acquire the single sign-on token; and a region where the sign-on information used to access a specific application service server is automatically input on the basis of the single sign-on token.

The terminal may further include a display unit configured to output at least one of: a logout item for requesting a termination of the service token; a pop-up window for requesting a termination of the single sign-on token; and a service region for outputting data received from the application service server.

The controller may support control of creation of an accounting manager account for operating the single sign-on token or to control an activation of a cloud service function and may control deletion of the accounting manager account when the single sign-on token is terminated.

When a specific application is selected to activate, the controller may control checking of whether the web browser operates single sign-on cookie information and transmission of a message for performing automatic login of the application to the application service server using the single sign-on token provided through the single sign-on cookie information.

When the web browser cannot operate the single sign-on cookie, the specific application may perform an integration ID login to receive a one-time access key from a single sign-on service server and then provide the one-time access key to the web browser, and the web browser may access the single sign-on service server on the basis of the one-time access key to receive the single sign-on cookie information.

Still yet another aspect of the present invention provides a single sign-on service operating method including: providing, by a terminal, a session inquiry message for performing an integration ID login or pre-stored single sign-on token-based single sign-on to an application service server during, during access to an application service server in order to operate a specific application function; performing, by an application service server, the integration ID login and then transmitting a single sign-on token creation request message to the single sign-on service server or transmitting the session inquiry message to the single sign-on service server; receiving, by the application service server, an integration service number corresponding to the single sign-on token or the session inquiry message from the single sign-on service server; and when the single sign-on token is received, providing, by the application service server, the single sign-on token and a service token and data for using the application service server to the terminal, and when the integration service number is received, performing automatic login of the application and providing the service token and data to the terminal.

The single sign-on service operating method may further include: transmitting, by the terminal, a service token termination request message to the application service server or a service token and single sign-on token termination request message to the application service server; providing, by the application service server, a service token termination response message to the terminal or transmitting the single sign-on token termination request message to the single-sign service server and providing a single sign-on token termination response message in addition to the service token termination response message, to the terminal, and performing, by the terminal, at least one of the service logout and the single sign-on logout.

Still yet another aspect of the present invention provides a single sign-on service operating method including: when an input signal for activating a specific application is received, calling, by a web browser of a terminal, the specific application and providing a single sign-on cookie information-based single sign-on token to the specific application; providing, by the application, a session inquiry message for automatic login to a single sign-on service server through application service server, using the single sign-on token; creating, by the single sign-on service server, an integration service number corresponding to the session inquiry message and providing the created integration service number to the application service server; creating, by the application service server, a service token for operating the application service on the basis of the integration service number; and providing, by the application service server, the service token and user data for operating the application service to the application.

The single sign-on service operating method may further include: when the web browser cannot operate the single sign-on cookie information, providing, by the application, information for an integration ID login to the single sign-on service server through the application service server; providing, by the single sign-on service server, a one-time access key to the application; providing, by the application, the one-time access key to the web browser; and accessing, by the web browser, the single sign-on service server using the one-time access key to receive the single sign-on cookie information.

The single sign-on service operating method may further include: receiving an input signal for completing the web browser or performing a logout from a web browser-based single sign-on service; transmitting a request message corresponding to the input signal to the single sign-on service server; deleting, by the single sign-on service server, stored single sign-on cookie information and providing a response message corresponding to the request message to the terminal; and performing, by the terminal, the logout of the service.

Still yet another aspect of the present invention provides a computer readable record medium recording a program for executing the method.

Advantageous Effects

As described above, the single sign-on service system and method of the present invention can facilitate a sign-on needed to operate various applications with one-time input for operating a specific application and can support easy sign-on management.

In addition, the present invention may support use of various applications provided by a specific service provider on the basis of single sign-on information, thereby saving the cost of and improving efficiency of managing the sign-on information while increasing transparency and reliability of management of the sign-on information.

MODES OF THE INVENTION

Hereinafter, embodiments of the present invention will be described in detail with reference to the accompanying drawings.

In describing embodiments, the description of a technique that is well known to a person skilled in the art and not directly related to the present invention will be omitted. In addition, the detailed description of elements having substantially the same configuration and function will be omitted.

Likewise, some elements in the accompanying drawings are exaggerated or omitted, and each element is not necessarily to scale. Accordingly, the present invention is not limited to relative sizes or intervals illustrated in the accompanying drawings.

Figure 1:
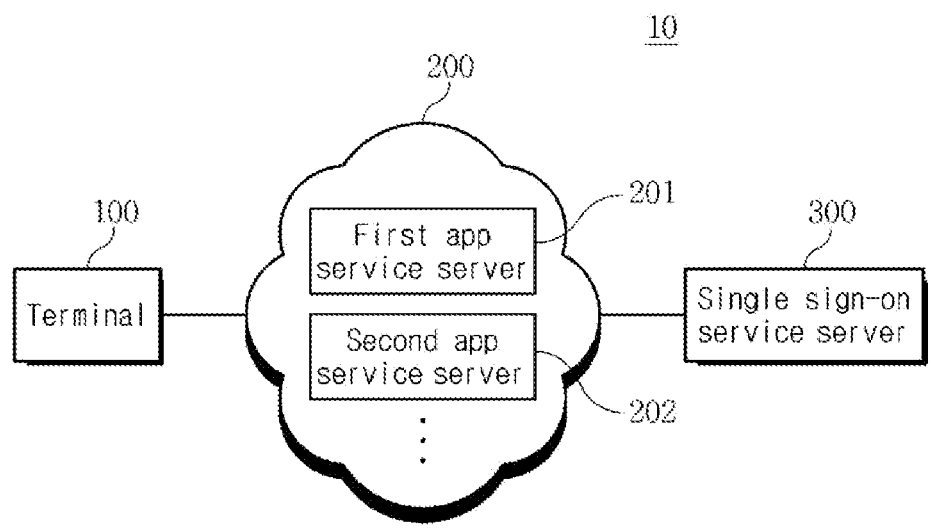
FIG. 1 is a schematic block diagram showing a configuration of a single sign-on service system according to embodiments of the present invention.

FIG. 1 is a schematic block diagram showing a configuration of a single sign-on service system according to embodiments of the present invention.

Referring to FIG. 1, a single sign-on service system 10 of the present invention may include a terminal 100, application service servers 200, and a single sign-on service server 300. Here, the terminal 100 establishes a communication channel with the application service servers 200 in order to operate a specific application (hereinafter referred to as an application), and the application service servers 200 establishes a communication channel with the single sign-on service server 300 in order to support a single sign-on of applications of the terminal 100.

In particular, the single sign-on service system 10 of the present invention supports reception by the terminal 100 of a service token and a single sign-on (SSO) token from an application service server, for example, a first application service server 201, which is accessed through a specific application, and operation of an authenticator for performing single sign-on management on the basis of the received tokens. Here, the authenticator supports extraction of the single sign-on token when each mobile application is activated. Thus, in a mobile environment that maintains the authenticator, the terminal 100 may automatically receive a service token from a specific application service server, such as a second application service server 202, for supporting a specific application, for example, the second application. The second application of the terminal 100 may support use of a service supported by the second application service server 202 using the received service token. Here, the authenticator may be implemented variously, depending on an operating system supported by the terminal 100. In this way, the authenticator may be implemented in a specific type of software module, depending on an operating system of each terminal 100, in order to support management of the sign-on information.

As described above, the single sign-on service system 10 of the present invention is designed such that the application service servers 200 may operate a single sign-on token issued by the single sign-on service server 300 when the terminal 100 accesses the application service server 200 to operate the specific application. The application service servers 200 allocates a service token to each application of the terminal 100 on the basis of the single sign-on token and thus supports access by the terminal 100 of the application service servers 200 and use of the application service. Thus, when at least one of various applications is operated by the terminal 100, the single sign-on service system 10 of the present invention supports reception by the terminal 100 of a service token from the application service servers 200 and use of the service token using a single sign-on token provided by the previously created authenticator. As a result, the single sign-on service system 10 of the present invention supports free access of the application service servers 200 and use of the services using the service token provided on the basis of the single sign-on token, without separately transmitting or receiving sign-on information for each application. Respective elements constituting the single sign-on service system 10 will be described in more detail with respect to FIGS. 2 to 4.

Figure 2:
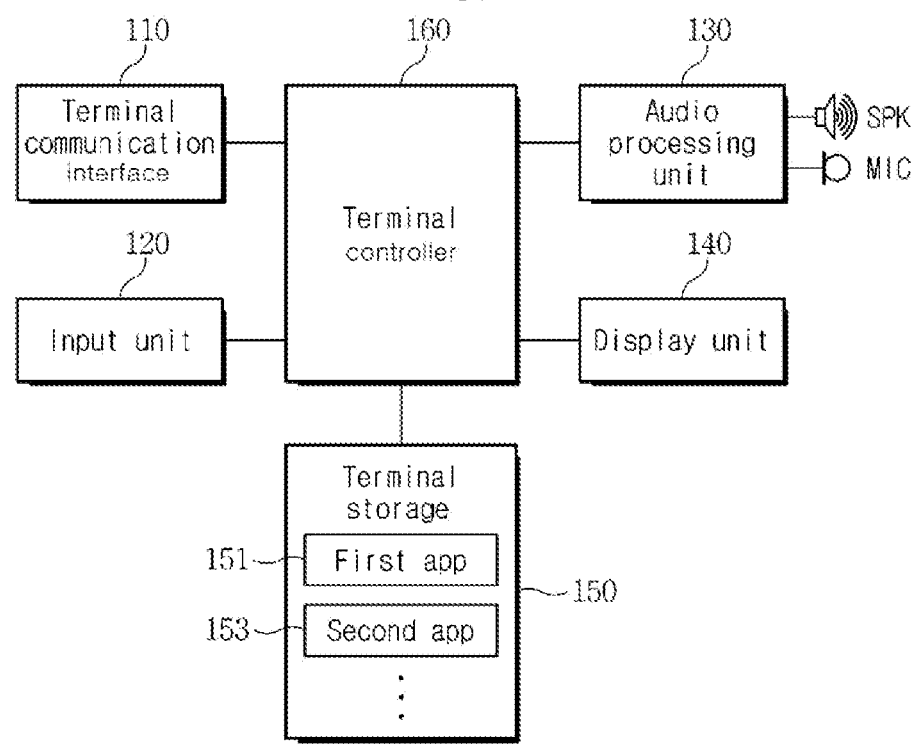
FIG. 2 is a more detailed block diagram showing a configuration of a terminal according to an embodiment of the present invention.

First, FIG. 2 is a more detailed block diagram showing a configuration of a terminal 100 according to an embodiment of the present invention.

Referring to FIG. 2, the terminal 100 of the present invention may include a communication interface 110, an input unit 120, an audio processing unit 130, a display unit 140, a storage 150, and a controller 160.

The terminal 100 of the present invention may access the first application service server 201 using the communication interface 110 according to a request for activating a specific application, for example, a first application 151 stored in the storage 150. In this case, the terminal 100 checks whether there is a previously created authenticator in order to operate a single sign-on service. If there is no authenticator, the terminal 100 may operate an authenticator for providing a single sign-on token used to perform a single sign-on between applications through the first application service server 201. When the authenticator may provide the single sign-on token, the terminal 100 may extract a single sign-on token from the authenticator and access another application service server, for example, the second application service server 202, on the basis of the extracted single sign-on token. Thus, the terminal 100 of the present invention may access the second application service server 202 to use another application service without providing separate sign-on information if the terminal 100 has already operated the authenticator for providing the single sign-on token on the basis of a specific application among a plurality of applications 151 and 153. To this end, the communication interface 110 supports a communication function of the terminal 100 to establish a communication channel with the application service servers 200. The communication interface 110 may include a mobile communication module to support mobility of the terminal 100. Thus, the communication interface 110 may access a base station or wireless access point installed to support a communication service and access the application service servers 200 through a network device connected with the base station or wireless access point. In addition, when it is impossible to operate the authenticator for providing the single sign-on token, the communication interface 110 may transmit an integration ID information-based login request message to the first application service server 201 according to control of the controller 160.

In response to this, the communication interface 100 may receive the service token, user data, and single sign-on token from the first application service server 201. When it is possible to operate the authenticator, the communication interface 110 may transmit, for example, to the second application service server 202, an inquiry message for inquiring the single sign-on session on the basis of the single sign-on token extracted from the authenticator, and receive a service token and user data corresponding to the inquiry message from the application service server 202. The information received by the communication interface 110 is delivered to the controller 160. The controller 160 may support a specific application-based user function on the basis of the received information. The input unit 120 may support creation of an input signal needed to operate the terminal 100. The input signal may be created with a key button, such as a home key, side key, etc., and output a virtual key map on the display unit 140 implemented with a touch screen. The input unit 120 may create an input signal for activating at least one of the applications 151 and 153 supported by the terminal 100. The input signal may be delivered to the controller 160 and used as a command for activating the application. Furthermore, the input unit 120 may input the sign-on information required by the application service server according to activation of a specific application.

In particular, the input unit 120 may input the sign-on information for an integration ID login according to a user's control in order to acquire the single sign-on token according to an embodiment of the present invention. After the single sign-on token is acquired or the authenticator is created on the basis of the single sign-on token, the input unit 120 may create a predefined and simplified specific input signal in order to check sign-on information of applications that are additionally activated. For example, the specific input signal may be an input signal for selecting a confirmation key on a single sign-on screen for requesting access to the specific application service server. The audio processing unit 130 may include a speaker SPK for outputting a variety of audio data generated during an operation of the terminal 100 and a microphone MIC for collecting the audio data. In particular, the audio processing unit 130 may output a variety of audio data generated during activation of the specific applications 151 and 153 supported by the terminal 100. In this case, the audio processing unit 130 may output a warning announcement sound when incorrect sign-on information is input during activation of a specific application and an access to application service server. When the application service server provides audio data according to activation of a specific application, the audio processing unit 130 may support output of the audio data.

The display unit 140 displays information input by a user or information provided to the user, in addition to all kinds of menus of the terminal 100. That is, the display unit 140 may provide various screens, for example, a standby screen, a menu screen, a message composing screen, a call screen, a terminal completion screen, a terminal booting screen, etc., according to the use of the terminal 100. The display unit 140 may be formed in a flat display panel, such as a liquid crystal display, an organic light emitted diode (OLED), and so on. The display unit 140 may be manufactured to include a display panel and a touch panel.

In particular, the display unit 140 of the present invention may output a screen for inputting sign-on information to access the application service server according to activation of the specific application. In this case, the sign-on information input screen output by the display unit 140 may include an ID input region and a password input region for inputting general sign-on information or integration sign-on information. The sign-on information input screen may include a simple login selection item for an integration ID login on the basis of the input sign-on information. When the integration ID login is performed, the single sign-on service server 300 may deliver the single sign-on token to the application service server, and the display unit 140 may output a reception screen for the service token, user data, and a single sign-on token created by the single sign-on token from the application service server. In addition, the display unit 140 may output a single sign-on token-based login screen on the basis of the single sign-on token.

When the terminal 100 receives the single sign-on token from the application service server, the terminal 100 may support operation of the authenticator on the basis of the received single sign-on token. In this case, the operation of the authenticator may be notified of through the display unit 140. Alternatively, the operation of the authenticator may be performed through background processing without a separate alarm. However, the display unit 140 may output a specific image effect or indicator for informing that the terminal may access various applications through the authenticator without separate input of sign-on information.

For example, the display unit 140 may output an indication icon or informational message for informing of an operation state of the authenticator and a possibility of access to the application service server, at one side thereof. However, the indication icon, informational message, or image effect may not be provided fixedly to the display unit 140, and may be output to an application activation screen when a specific application requiring sign-on information to be input is activated while the authenticator is operated. The sign-on information input screen provided through the display unit 140 will be described below in more detail with reference to the accompanying drawings. The storage 150 stores a screen image to be output to the display unit 140, in addition to application programs necessary for functional operations according to an embodiment of the present invention. In addition, when the display unit 140 includes a touch screen, the storage 150 may store a key map or menu map for operating the touch screen. Here, the key map or menu map may have various forms. That is, the key map may be a keyboard map, a 3*4 key map, or a control key map for controlling an operation of the application program currently activated. In addition, the menu map may be a menu map for controlling the operation of the application program currently activated. The storage 150 may store an operating system (OS) for booting the terminal 100 and operating the above described elements and application programs for supporting various user functions, for example, a user function for supporting a call of the terminal 100, an MP3 user function for reducing various sound sources, an image outputting function for reproducing pictures, and a video reproducing function.

In particular, the storage 150 of the present invention may store various applications 151 and 153 designed to communicate with a specific application service server and provide a specific user function. For example, the storage 150 may store the first application 151 and the second application 153. At least one of the first application 151 and the second application 153 is an application designed to support a specific user function that can be supported by the terminal 100. In the present invention, the application may be an application that establishes a communication channel with each of the application service servers 200 and provides specific data by checking the automatic sign-on information along with the application service servers 200 on the basis of the single sign-on token. In particular, the first application 151 and the second application 153 may each be a user function supported by the application service servers that can be managed by one provider or common service provider to support the service on the basis of the single sign-on token.

For example, the first application 151 may support a user function on the basis of communication with the first application service server 201, and the second application 153 may support a user function on the basis of communication with the second application service server 202. In this case, the first application service server 201 and the second application service server 202 may be integrated and implemented as one device, such that the single sign-on service server 300 may mange the sign-on information. That is, the first application service server 201 and the second application service server 202 may be the application service servers 200 having sign-on information jointly managed by a specific service provider.

As an exemplary service, the first application 151 may be a chatting service application, and the second application 153 may be a shopping mall application. In this case, an application service server for supporting the chatting service and the shopping mall may be configured to commonly manage the sign-on information. As another exemplary service, the first application 151 may be a first game application, and the second application 153 may be a second game application. Here, an application service server for supporting the first game application and an application service server for supporting the second game application may be provided by the same service provider, or service providers that can jointly perform account management, and thus may be designed to be accessible on the basis of the single sign-on token provided by the service provider. Each application service server may also support access by inputting and checking individual sign-on information according to a user's request.

In above description, the storage 150 has been described as storing two applications, but the present invention is not limited thereto. That is, the storage 150 may store more applications, all of which may be applications associated with application service servers accessible on the basis of the single sign-on token. The controller 160 may control various signal flows, data processing, and data transmission/reception to support a single sign-on service function according to an embodiment of the present invention. For example, the controller 160 may output at least one of a menu, an icon, and a widget to activate at least one of the first application 151 and the second application 153 stored in the storage 150. Alternatively, the controller 160 may allocate a hot key for activating the first application 151 and the second application 153 according to a predefined schedule.

When an input signal for activating a specific application is generated, the controller 160 may collect application service server address information for supporting the application, activate the communication interface 110, and control access of the application service server. In this case, the controller 160 checks whether there is a service token accessible to the application service server, and if there is no service token, checks whether there is the authenticator capable of supporting the single sign-on token. Furthermore, if there is no authenticator, the controller 160 may compose a request message for requesting the single sign-on token, including information input by the user, and transmit the message to a specific application service server for supporting a specific application function. Here, the input information included in the request message may be input information, for example, ID information and password information, which were previously registered with the application service server in order to activate the application, or integration ID information and password information which were preset for single sign-on.

Subsequently, when the single sign-on token generated by the single sign-on service server 300 and the service token and user data needed to use the application service server are received from the application service server, the controller 160 supports a user function according to activation of the application on the basis of the information. In addition, the controller 160 may support operation of the authenticator using the single sign-on token. The controller 160 provides the single sign-on token through the authenticator when another application activation request is received. The single sign-on token provided by the authenticator may be provided to the application service server, and the single sign-on service server 300 may support the user in automatically checking the sign-on information of the application service server without separately inputting the sign-on information. The controller 160 may control reception by the application service server of the data for supporting another application selected for activation and output of the data to the display unit 140, or if the data is audio data, output of the audio data through the audio processing unit 130.

Figure 3:
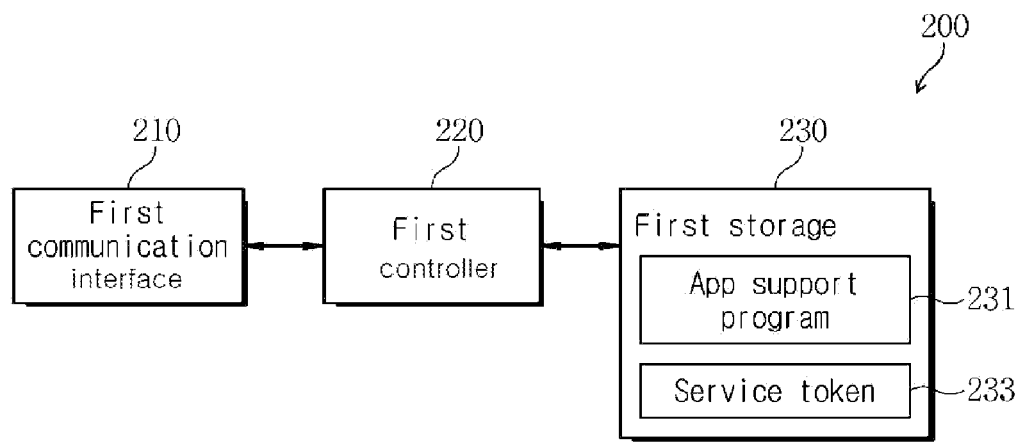
FIG. 3 is a more detailed block diagram showing a configuration of an application service server according to an embodiment of the present invention.

In addition, when an input signal for completing or logging out from a specific application is generated, the controller 160 may receive confirmation on whether only the application service is completed or logged out from or the single sign-on service using the authenticator is completed or logged out from during the completion or logout process in addition to the application service, and then control the completion or logout process. Here, when a signal for completing or logging out from applications activated by the authenticator is generated, the controller 160 may control completion of the applications according to the completion signal or logout signal and removal of the authenticator and the single sign-on token during a completion or logout of the last application. Alternatively, when completing or logging out an application that is the first to be completed or logged out among applications activated on the basis of the single sign-on token, the controller 160 may perform signal processing for removing the authenticator and the single sign-on token. Alternatively, when completing or logging out from an application for receiving a first single sign-on token from the single sign-on service server 300, the controller 160 may support removal of the single sign-on token and the authenticator. FIG. 3 is a more detailed block diagram showing a configuration of an application service server 200 according to an embodiment of the present invention. In the description, the application service server 200 may be at least one of the first application service server 201 and the second application service server 202. Thus, the application service server 200 is hereinafter referred to as an application service server and allocated reference number 200 to provide a common description thereof. Referring to FIG. 3, the application service server 200 of the present invention may include a communication interface 210, a first controller 220, and a first storage 230. Additionally, the application service server 200 may further include an input unit, a display unit, etc. to support and manage an application service.

The first communication interface 210 may establish a communication channel with the terminal 100 in order to support a user function according to activation of a specific application of the terminal 100. The first communication interface 210 may receive an access request message from the terminal 100, and in response to this, transmit a sign-on information request message. Subsequently, the first communication interface 210 may receive a message including the sign-on information or a request message for requesting single sign-on from the terminal 100.

The received message may be delivered to the first controller 220 and then used to perform sign-on for supporting an application function of the terminal 100. If the received message is an integration ID login request message or a single sign-on inquiry message, the received message may be provided to the single sign-on service server 300. To this end, the first communication interface 210 may establish a communication channel with the single sign-on service server 300. The communication interface 210 may provide an integration ID login request message or a single sign-on request message to the single sign-on service server 300, and in response to the request message, receive a single sign-on token or integration service number from the single sign-on service server 300. The received single sign-on token may be provided to the terminal 100, and the received integration service number may used in an automatic login service for supporting the application function of the terminal 100.

The first communication interface 210 may include a communication module for establishing a communication channel with the terminal 100 and a communication module for establishing a communication channel with the single sign-on service server 300. Alternatively, the first communication interface 210 may include one communication module for establishing communication channels with the terminal 100 and the single sign-on service server 300. To this end, communication interfaces for accessing the terminal 100 and the single sign-on service server 300 may be implemented to be compatible or the same.

The first storage 230 stores an operating system needed to operate the application service server 200, and various application programs. In particular, the first storage 230 may include an application support program used to support a specific application function of the terminal 100 and store a service token 233 allocated for service use of the terminal 100. In addition, the first storage 230 may store identification information of the terminal 100 through pre-registration of the terminal 100. The identification information of the terminal 100 may be used to check whether the terminal 100 is a registered terminal for normal service use. To this end, the first storage 230 may store the identification information including ID information and password information registered by the terminal 100 according to a predetermined rule.

The application support program 231 may include a sign-on processing routine for checking whether the terminal is a pre-registered terminal according to an access request of the terminal 100, and a routine for providing a service token and user data corresponding to activation of an application by the signed-on terminal 100. In particular, the application support program 231 may store a routine for processing an integration ID login of the terminal 100 or processing a mobile single sign-on token-based single sign-on request, a routine for delivering the single sign-on token to the terminal 100 according to the processing of the integration ID login, and a routine for supporting an automatic login function based on an integration service number.

The service token 233 is information that is provided such that the terminal 100 may use a service provided by the application service server 200. The service token 233 may be allocated to the terminal 100 when the terminal 100 requests access and the sign-on is performed normally, and the service token 233 may be returned or discarded when the application service function is completed. The service token 233 may be created in connection with or on the basis of the single sign-on token provided by the single sign-on service server 300 when the terminal 100 requires the single sign-on service.

The first controller 220 may control various signal processing, data processing, and data transmission for operating the application service server 200. When an access request is received from the terminal 100, the first controller 220 may control requesting of the sign-on information of the terminal 100 according to predefined schedule information. When the sign-on information is received from the terminal 100, the first controller 220 may check whether the sign-on information is consistent with pre-registered information, and then provide data needed for the application service function.

Here, when a single sign-on request message is received from the specific application of the terminal 100, the first controller 220 may control provision of the request message to the single sign-on service server 300. In addition, when the single sign-on token is received from the single sign-on service server 300, the first controller 220 may provide the terminal 100 with a service token and user data in addition to the single sign-on token. Here, the first controller 220 may perform a sign-on on the terminal 100 on the basis of the integration ID information and password information included the single sign-on request message. Here, the first controller 220 may create a service token for the terminal 100 to use the application service on the basis of or in connection with the single sign-on token.

Here, when a single sign-on token-based session inquiry message is received from the specific application of the terminal 100, the first controller 220 may deliver the session inquiry message to the single sign-on service server 300. When an integration service number according to the single sign-on is received from the single sign-on service server 300, the first controller 220 may perform login of the terminal 100 and create the service token on the basis of the received integration service number. The first controller 220 may provide, to the terminal 100, the created service token and user data for supporting an application service function. That is, the first controller 220 may accept the login and support the application service function without separately checking the sign-on information, according to check of an application of the terminal 100 that requests access on the basis of the single sign-on token by the single sign-on service server 300.

In above-description of the application service server 200, the specific application service server 200 has been described as supporting the login based on the single sign-on request message and the login based on the single sign-on token. However, the present invention is not limited thereto. That is, according to a design method of a system designer, the application service server for supporting a single sign-on request message-based login may be fixed, for example, as the first application service server 201. For example, the first application service server 201 for supporting a first application 151 of the terminal 100 may be designed to support a login on the basis of the single sign-on request message, and the second application service server 202 for supporting the second applications 153 may be designed to support a single sign-on token-based login and a general sign-on information-based login. Alternatively, the second application service server 202 may be a device for providing the single sign-on token, and the first application service server 201 may be a device for performing login on the basis of the single sign-on session inquiry message.

Figure 4:
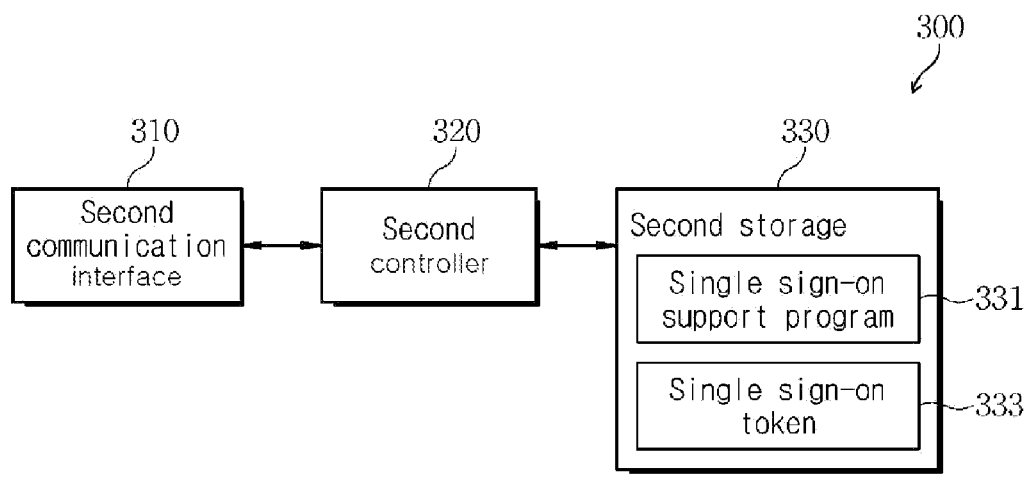
FIG. 4 is a more detailed block diagram showing a configuration of a single sign-on service server according to an embodiment of the present invention.

FIG. 4 is a detailed block diagram showing a configuration of a single sign-on service server 300 according to an embodiment of the present invention.

Referring to FIG. 4, the single sign-on service server 300 of the present invention may include a second communication interface 310, a second controller 320, and a second storage 330. Similarly to the application service server 200, the single sign-on service server 300 may further include an input unit, a display unit, etc. to manage the device or update the specific data.

The second communication interface 310 may establish a communication channel with the application service server 200. To this end, the second communication interface 310 may include a communication module for communicating data with the application service server 200 or a communication module for transmitting data to a network device accessed by the application service server 200 and receiving data from the network device. The second communication interface 310 may receive the single sign-on request message or the single sign-on session inquiry message from the application service server 200. In addition, the second communication interface 310 provides, to the application service server 200, at least one of the integration service number and the single sign-on token created by the second controller 320.

The second storage 330 stores programs for operating the single sign-on service server 300. In particular, the second storage 330 may store a single sign-on support program 331, which is a program for supporting a single sign-on service of the present invention, and a single sign-on token 332.

The single sign-on support program 331 may support creation of the integration service number or creation of the single sign-on token according to the message received from the application service server 200. To this end, the single sign-on support program 331 may include a routine for identifying a type of the message received from the application service server 200, a routine for creating an integration service number corresponding to the received message when the received message is a single sign-on session inquiry message, and a routine for providing the created integration service number to the application service server 200. Furthermore, when the received message is a single sign-on request message, the single sign-on support program 331 may include a routine for creating the single sign-on token and a routine for providing the created single sign-on token to the application service server 200.

The single sign-on token 332 is information that supports access and use by the terminal 100 of a plurality of application service servers. The single sign-on token 332 may be created when the terminal 100 requests to use the single sign-on service, transmitted to the terminal 100 through the application service server 200, and stored in the second storage 330. Subsequently, the single sign-on token 232 may be used to check effectiveness of the single sign-on session inquiry message. To this end, the terminal 100 may receive, from the authenticator, the single sign-on token that has been received from the single sign-on service server 300 through the application service server 200 before composing the single sign-on session inquiry, and transmit the single sign-on token together with the message. The single sign-on token 332 may be discarded according to a single sign-on service completion request of the terminal 100.

The second controller 320 may control processing and transmission of various signals needed to operate the single sign-on service server 300. In particular, the second controller 320 may support creation, provision, and management of the single sign-on token 332 for the single sign-on service support of the present invention and creation, provision, and management of the integration service number based on the single sign-on token 332. For more detailed description, when the single sign-on request message is received from the application service server 200, the second controller 320 may create the single sign-on token 332 according to the request. When the single sign-on token 332 is created, the second controller 320 may provide the single sign-on token 332 to the application service server 200.

Here, the second controller 320 may not separately verify the effectiveness because the verification of the effectiveness of the terminal 100 which transmits the single sign-on request message may be performed through the sign-on of integration ID information of the application service server 200. However, the second controller 320 may check whether the terminal 100 is a pre-registered terminal to use the single sign-on service on the basis of information about the terminal 100 included in the single sign-on request message according to a design method of a system designer. To this end, the single sign-on service server 300 may store and manage the information about the terminal 100 which is pre-registered to use the single sign-on service.

When a single sign-on session inquiry message is received from the application service server 200, the second controller 320 checks the single sign-on token included in the inquiry message. In addition, the second controller 320 may check whether the single sign-on token included in the inquiry message is the same as the pre-registered single sign-on token 332, or whether the single sign-on token is effective by performing comparison with the single sign-on token 332. Here, effectiveness is checked considering a creation time of the single sign-on token 332. That is, even if the single sign-on token included in the inquiry message is the same as the pre-registered single sign-on token 332, the second controller 320 may determine that the single sign-on token loses its effectiveness when a pre-designed threshold time elapses, and then block support of the single sign-on token-based single sign-on service. The design of effectiveness for the single sign-on token 332 may not be applied according to a design method of a system designer. When the single sign-on token of the received inquiry message is effective, or the same as the pre-stored single sign-on token 332, the second controller 320 may create an integration service number for supporting use of the application service server and provide the created integration service number to the application service server 200. The integration service number may be used as information that supports acceptance of a login of the terminal 100 desiring to access the application service server 200.

The second controller 320 may receive a message for removing the single sign-on token from the application service server 200. In this case, the second controller 320 may remove the single sign-on token and transmit, to the application service server 200, that the single sign-on token has been removed.

As described above, the single sign-on service system 10 of the present invention and illustrative elements thereof allows the applications of the terminal to use the single sign-on service on the basis of the single sign-on token. Thus, a user may immediately use a necessary service without unnecessarily and repetitively inputting and acquiring the sign-on information during activation of various applications and utilization of the corresponding services.

Figure 5:
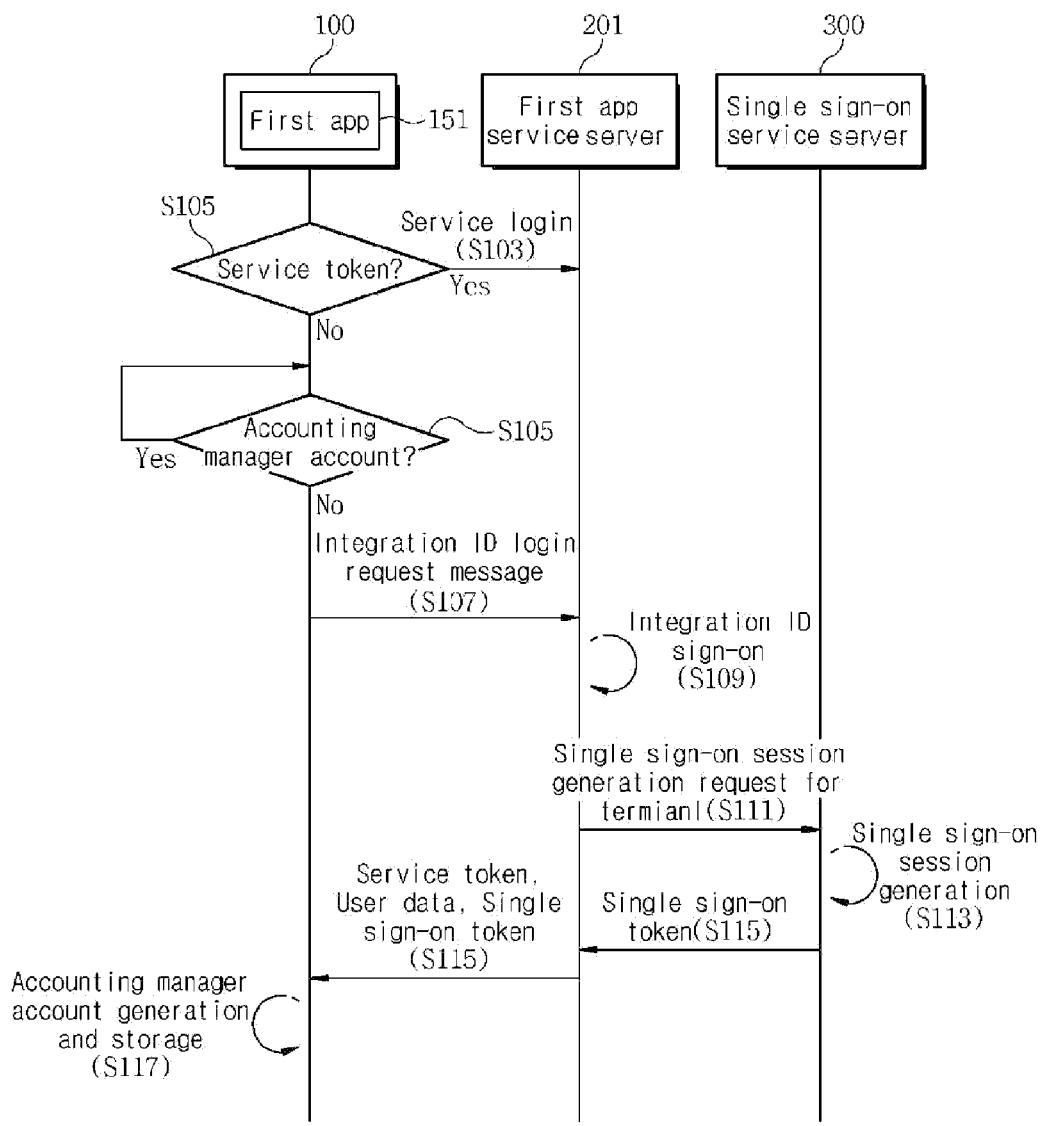
FIGS. 5 and 6 are each a flowchart illustrating a single sign-on operating method according to a first embodiment of the present invention.

FIG. 5 illustrates an authenticator-based operating method in the single sign-on service system operating method according to a first embodiment of the present invention.

Referring to FIG. 5, in the single sign-on service system operating method, when a user of the terminal 100 creates an input signal for activating a specific application stored in the storage 150, for example, a first application 151, the terminal 100 may check whether there is a service token for supporting the first application 151 in operation S101. Here, the service token may be information for using the first application service server 201 to support a user function of the first application 151. If the terminal 100 has a history of using the first application service server 201, and the terminal 100 is in an effective time period where a re-access time is predefined or maintains login to the first application service server 201, the terminal 100 may maintain the service token. As a result, the terminal 100 may access the first application service server 201 on the basis of the history without a separate sign-on if there is a service token in operation S103.

If there is no service token in operation S101, the terminal 100 may check whether there is an accounting manager account in operation S105. A case in which there is the accounting manager account will be described with reference to FIG. 6.

If there is no accounting manager account in operation S105, the terminal 100 may compose an integration ID login request message in order to perform a single sign-on, and transmit the request message to the first application service server 201 in operation S107. The first application service server 201 may provide data for supporting a user function of the first application 151. When the single sign-on request message is received from the terminal 100, the first application service server 201 may perform an integration ID sign-on using login information included in the message, in operation S109. Subsequently, the first application service server 201 may compose a single sign-on session creation request message (createSSOSessionForMobile) for acquiring the single sign-on token, and transmit the request message to the single sign-on service server 300 in operations S111. Here, the single sign-on session creation request message may include the integration login information.

When the single sign-on session creation request message is received from the first application service server 201, the single sign-on service server 300 may create a single sign-on (SSO) session in operation S113 according to the reception of the request message. In addition, the single sign-on service server 300 may create a single sign-on token for operating a single sign-on session, and provide the single sign-on token to the first application service server 201 in operation S115. Alternatively, the single sign-on service server 300 may store and manage the created single sign-on token and the integration login information provided by the terminal 100 in order to identify the terminal 100 or examine effectiveness of the terminal 100 later.

When the single sign-on token is received from the single sign-on service server 300, the first application service server 201 may create a service token for using the first application service server 201 in connection with or on the basis of the single sign-on token, and provide the terminal 100 with the single sign-on token, service token, and user data according to support of the application service in operation S117. Then, the terminal 100 may create an accounting manager account on the basis of the single sign-on token received in operation S119, and store the single sign-on token in the storage 150. The terminal 100 may support a function of the first application 151 using the received service token.

Figure 6:
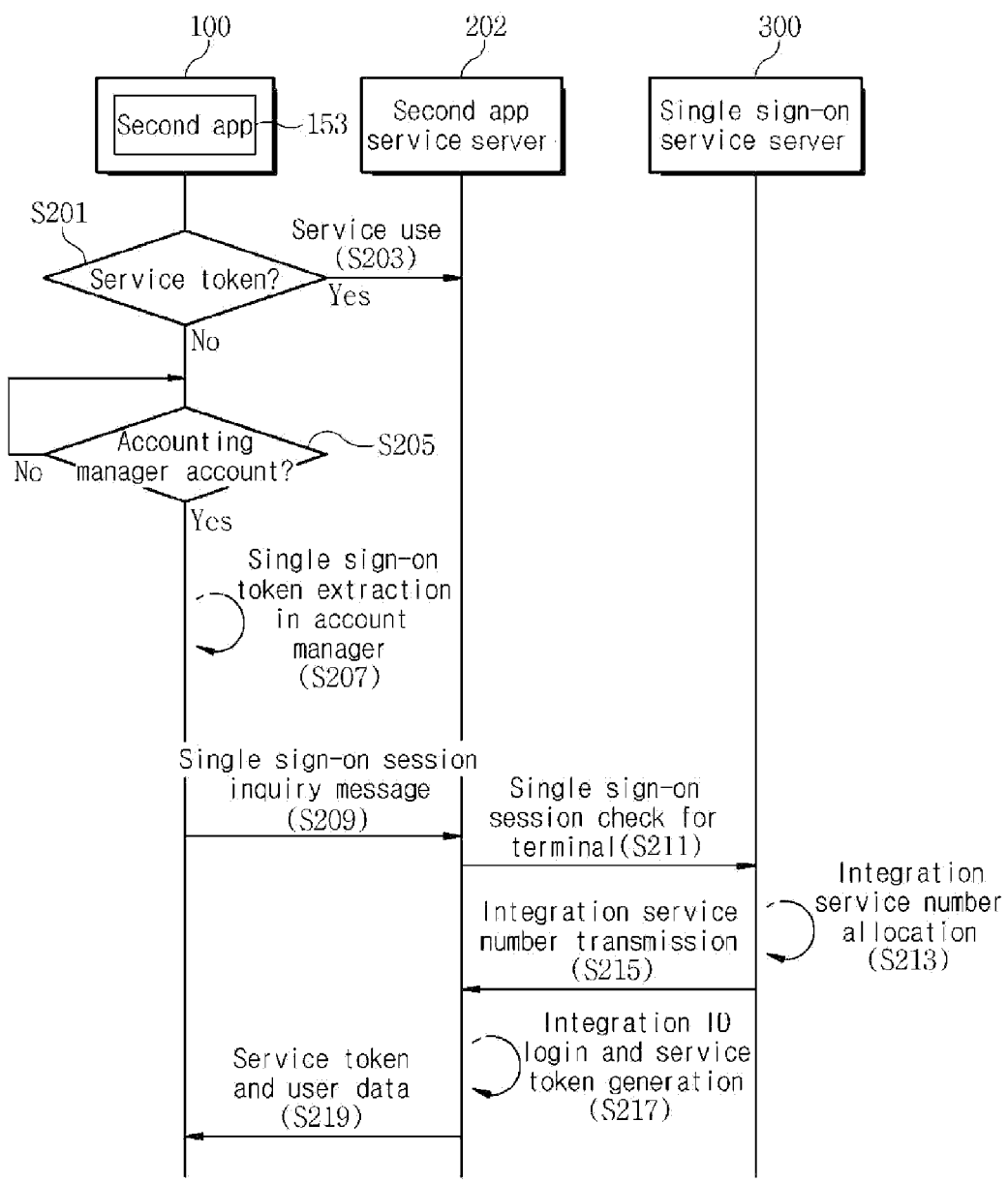

FIG. 6 illustrates a single sign-on token-based operating method in the single sign-on service system operating method according to a first embodiment of the present invention.

Referring to FIG. 6, a method of operating the single sign-on service system 10 of the present invention includes checking whether there is a service token for accessing the second application service server 202 for supporting the second application 153 and using the application service in operation S201 when the terminal 100 receives a request for activating the second application 153. If there is the service token, the terminal 100 may access the second application service server 202 on the basis of the service token and support data communication for using the application service in operation S203.

If there is no service token for operating the second application 153, the terminal 100 checks whether there is the accounting manager account in operation S205. If there is no accounting manager account, the terminal 100 may support a procedure according to the operating method above described with reference to FIG. 5. If there is the accounting manager account In S205, the terminal 100 may extract the single sign-on token from the accounting manager in operation S207. In addition, the terminal 100 may compose an inquiry message for inquiring a single sign-on session based on the single sign-on token and transmit the composed inquiry message to the second application service server 202 in operation S209.

When the inquiry message is received from the terminal 100, the second application service server 202 may compose a single sign-on session check message (checkSSOSessionForMobile) corresponding to the inquiry message and deliver the composed single sign-on session check message (checkSSOSessionForMobile) to the single sign-on service server 300. When the single sign-on session check message (checkSSOSessionForMobile) is received from the second application service server 202, the single sign-on service server 300 may check whether the single sign-on token provided by the terminal 100 is effective by checking the inquiry message included in the single sign-on session check message (checkSSOSessionForMobile). Then, when it is determined to receive the message composed based on the effective single sign-on token, the single sign-on service server 300 may create an integration service number corresponding to the single sign-on token in operations S213. If it is determined that the single sign-on token is not effective, the single sign-on service server 300 may compose an error message and provide the composed error message to the terminal 100 through the second application service server 202. Then, the terminal 100 may support acquisition of a new single sign-on token through the above described operating method of FIG. 5. The single sign-on service server 300 provides the created integration service number to the second application service server 202 in operation 215.

When the integration service number is received, the second application service server 202 may perform an integration ID sign-on and create a service token in operation S217. Here, the integration service number may include integration login information of the terminal 100. The single sign-on service server may check the integration login information of the pre-stored terminal 100 when creating the integration service number, and compose the integration login information together with the integration service number. The second application service server 202 may provide, to the terminal 100, the service token and user data for supporting a function of the second application 153 in operation S219.

Figure 7:
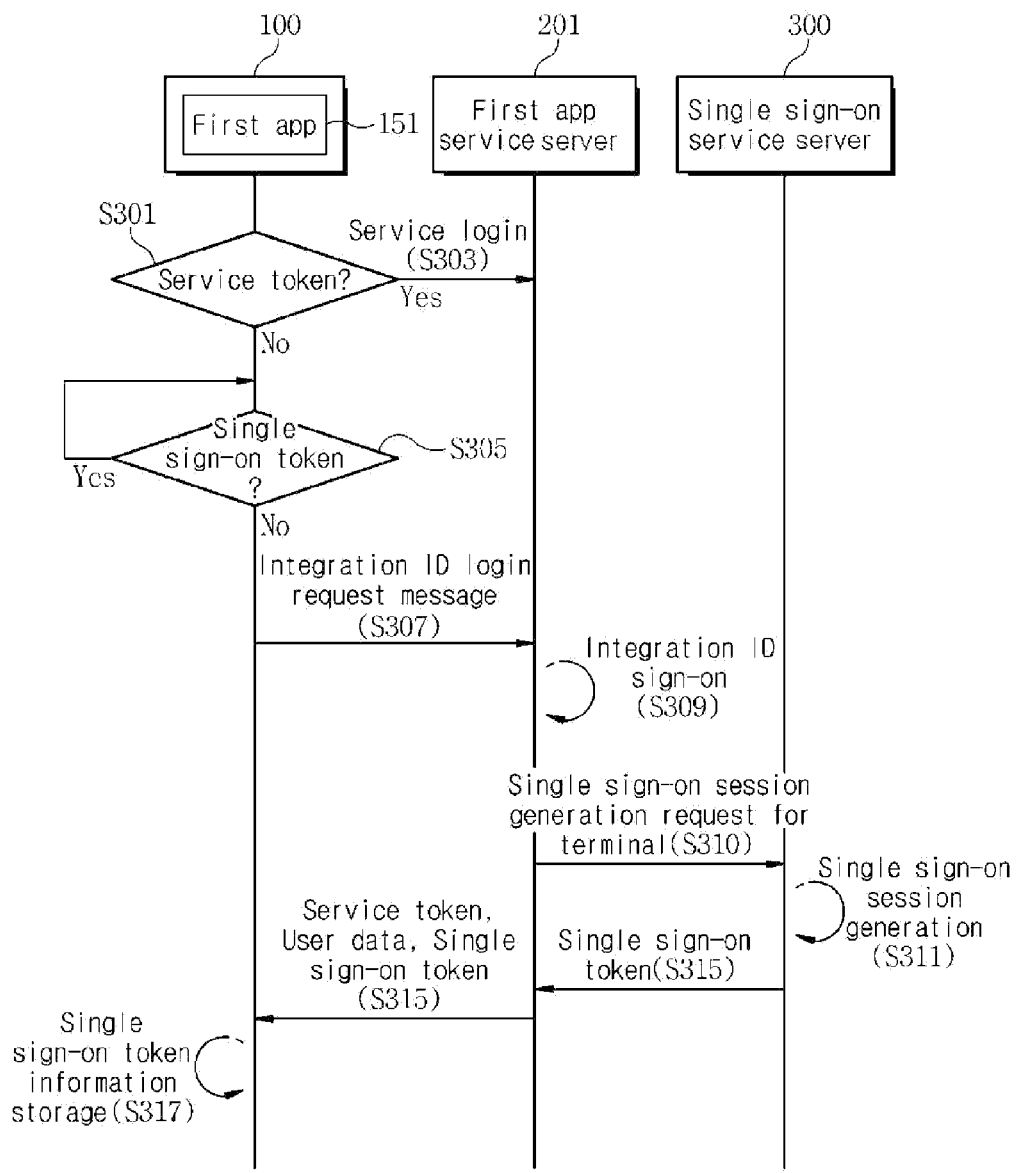
FIGS. 7 and 8 are each a flowchart illustrating a single sign-on operating method according to a second embodiment of the present invention.

FIG. 7 illustrates an authenticator-based operating method in the single sign-on service system according to a second embodiment of the present invention.

Referring to FIG. 7, a method of operating a single sign-on service system 10 of the present invention includes checking whether there is a service token in operation S301 when the terminal 100 requests activation of the first application 151, similarly to the above described operation S101. If there is a service token, the terminal may access the first application service server 201 using the service token in operation S303.

If there is no service token, the terminal 100 checks whether single sign-on token information is in a cloud service storage that functions as an authenticator in operation S305. To this end, the terminal 100 may activate a cloud client. A cloud service may be a service through which content stored in the terminal 100 can be shared with others through a separate communication service server. In this case, the cloud service may manage an account of the terminal 100 for the purpose of information sharing. In particular, the cloud service may manage the single sign-on token for supporting an application function on the basis of the single sign-on according to an embodiment of the present invention.

If there is no single sign-on token information in operation S305, each element, for example, the terminal 100, the first application service server 201, and the single sign-on service server 300, of the single sign-on service system 10 perform the same operations S107 to S119 as above described with reference to FIG. 5. That is, the terminal 100 transmits an integration ID login request message to the first application service server 201 in operation S307, and the first application service server 201 composes the single sign-on session request message (createSSOSessionForMobile) as well as performing an integration ID sign-on in operation S309 and transmitting the single sign-on session request message (createSSOSessionForMobile) to the single sign-on service server 300. Then, the single sign-on service server 300 may create a single sign-on session in operation S311 and transmit a single sign-on token to the first application service server 201 in operation S313. The first application service server 201 may create a service token and provide, to the terminal 100, user data for supporting a service of the first application 151 in addition to the single sign-on token in operation S315.

As a result, the terminal 100 may store the received single sign-on token in the cloud storage in operation S317 through the above operations. The terminal 100 may support a function of the first application 151 based on the received service token.

Figure 8:
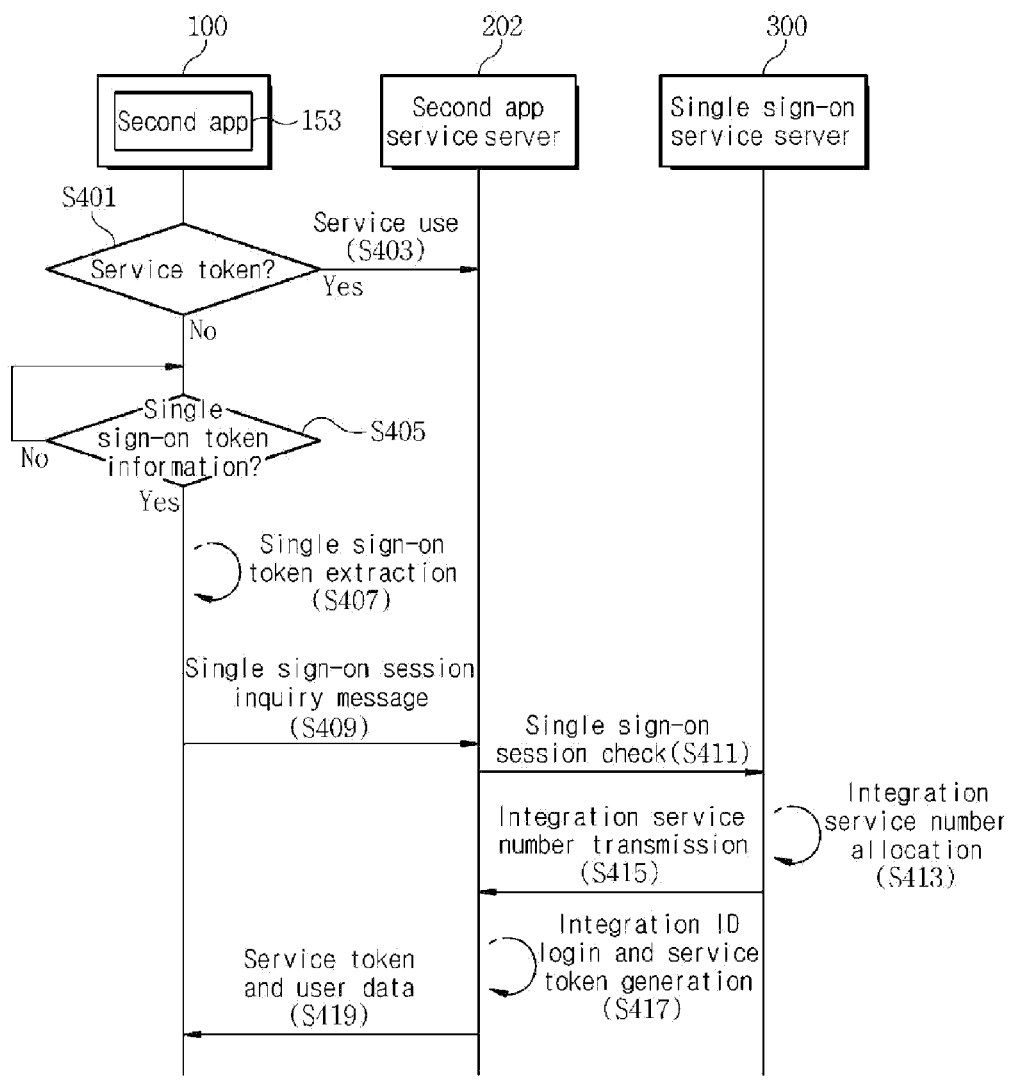

FIG. 8 illustrates a single sign-on token-based operating method in the single sign-on service system operating method according to a second embodiment of the present invention.

Referring to FIG. 8, when a request for activating the second application 153 is generated, a method of operating the single sign-on service system 10 of the present invention includes checking whether there is a service token that enables the terminal 100 to use the second application service server 202 in order to support a service of the second application 153 in operation S401. If there is no service token, the terminal 100 may check whether single sign-on token information is in a cloud service storage in operation S405. To this end, the terminal 100 may keep the cloud client activated. If there is a single sign-on token in operation S405, the terminal 100 extracts the single sign-on token from the cloud storage in operation S407. Here, the terminal 100 may check whether the single sign-on token is stored in the cloud service server, and if stored, may request the single sign-on token of the cloud service server. When the single sign-on token is stored in the cloud client, the terminal 100 may control collection of the single sign-on token information according to the activation of the client. The management of the single sign-on token may be changed according to a design method of a cloud system designer, and the terminal 100 of the present invention may be designed to collect the single sign-on token information according to the system design method.

Operations S409 to S419 performed by the single sign-on service system 10 are substantially the same as operations S209 to S219 described above with reference to FIG. 6. Thus, detailed description thereof will be omitted.

Figure 9:
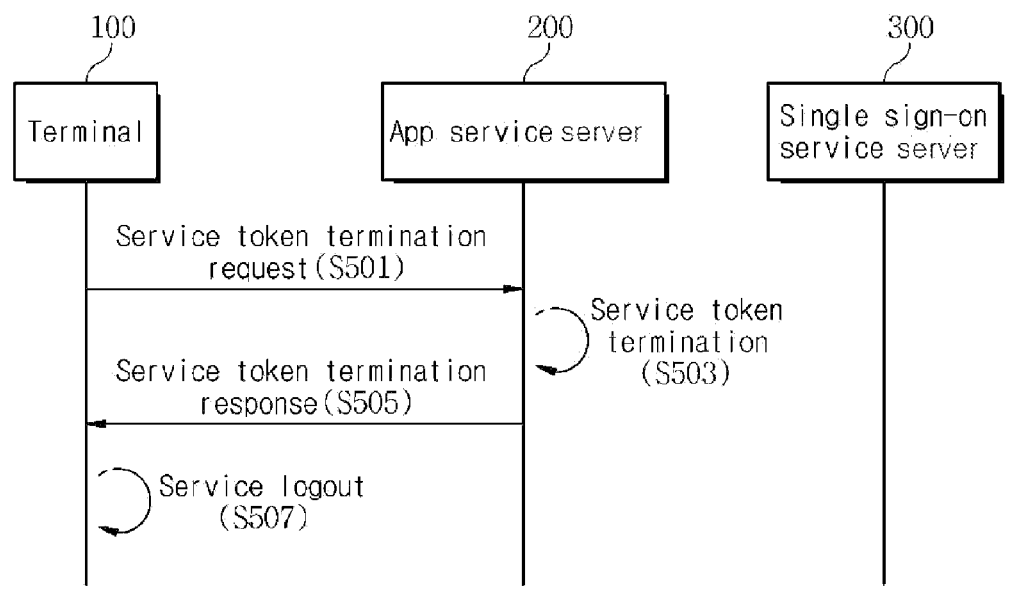
FIG. 9 illustrates a service logout operation of the single sign-on service system according to embodiments of the present invention.

FIG. 9 illustrates a logout of a service in the single sign-on service system according to an embodiment of the present invention.

Referring to FIG. 9, the terminal 100 may perform a logout procedure before completing an activated specific application. To this end, a user may generate an input signal for activating a virtual key button indicating logout in an application activation screen that is output to the display unit 140. Alternatively, when a signal for completing the activated application is generated, the terminal 100 may maintain the application in the login state during the predefined time period, and then when an additional input signal, for example, an input signal for reactivating the completed application, has not been generated during the time period, the terminal 100 may regard this situation as a logout event. Alternatively, the terminal 100 may regard the input signal for completing the specific application as the logout event.

When the input signal corresponding to the logout indication of a user is received or the above-described logout event is generated, the terminal 100 may compose a service token termination request message in operation S501 and transmit the service token termination request message to the application service server 200. When the service token termination request message is received from the terminal 100, the application service server 200 processes service token termination, corresponding to the reception of the request message, in operation S503. The application service server 200 may compose a service token termination response message and transmit the response message to the terminal 100 in operation S505.

When the service token termination response message corresponding to the service token termination response message is received in operation S507, the terminal 100 may change the application from the login state to the logout state on the basis of the reception. When the input signal for completing the application is received, the terminal 100 may first complete an application activation screen output to the display unit 140 and perform background processing on the logout according to the transmission or reception of the above message.

As described above, the single sign-on service system 10 of the present invention may maintain the single sign-on token while changing the specific application from the login state to the logout state. Thus, the single sign-on service system 10 supports automatic reception and operation of the service token from the application service server on the basis of a single sign-on token, which is not yet terminated, when the completed specific application is reactivated.

Figure 10:
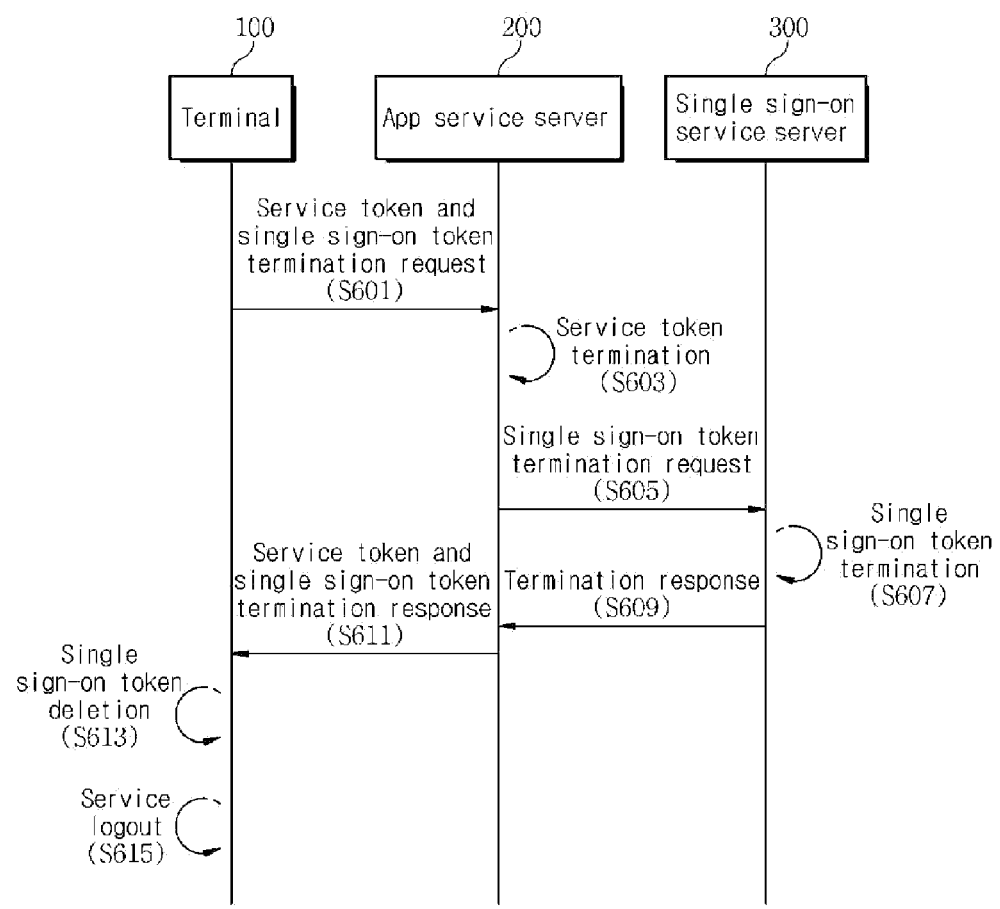
FIG. 10 illustrates a single sign-on logout operation of the single sign-on service system according to embodiments of the present invention.

FIG. 10 illustrates single sign-on logout in the single sign-on service system according to an embodiment of the present invention.

Referring to FIG. 10, when an input signal for indicating the single sign-on logout is received in addition to the logout of the specific application, the terminal 100 may compose a termination request message for requesting the service token and the single sign-on token and transmit the termination request message to the application service server 200 in operation S601. Here, the input signal for indicating the single sign-on logout in addition to the logout of the specific application may be received during a check of the single sign-on logout when completing the specific application. Alternatively, when the single sign-on logout is automatically performed in the specific application logout, the terminal 100 may determine the input signal for the application logout as also being used for the single sign-on logout. Alternatively, when the last activated application is completed or logged out while applications operated on the basis of the single sign-on are completed, the terminal 100 may compose a message in order to automatically perform the single sign-on logout.

When the termination request message for requesting termination of a service token and a single sign-on token is received from the terminal 100, the application service server 200 may terminate the service token in operation S603 and transmit the single sign-on token termination request message to the single sign-on service server 300 in operation S605. The single sign-on service server 300 may terminate the single sign-on token according to the received single sign-on token termination request message in operation S607 and deliver a single sign-on token termination response message to the application service server 200.

When the single sign-on token termination response message is received from the single sign-on service server 300, the application service server 200 may compose a service token and single sign-on token termination response message and transmit the composed termination response message to the terminal 100 in operation S611. When the termination response message is received, the terminal 100 deletes the accounting manager account and the single sign-on token information for each operating system or deletes the single sign-on token information from the cloud storage in operation S613. The terminal 100 may log out of the service in operation S615.

The single sign-on system for single sign-on of a plurality of applications and the operating method thereof have been described above in the first and second embodiments of the present invention. However, a single sign-on system for operating single sign-on of a plurality of applications on the basis of a web browser and an operating method thereof will be described in a third embodiment of the present invention.

The single sign-on system according to the third embodiment of the present invention has the same configuration as the first and second embodiments, but may further include an element for performing single sign-on based on the web browser. Accordingly, the terminal, application service server, and single sign-on service server of the single sign-on system according to the third embodiment of the present invention will be denoted by the same reference numerals as those of the first and second embodiments. However, the terminal and the single sign-on service server according to the third embodiment of the present invention are configured to further include elements associated with the web browser, and will be described with reference to FIGS. 11 and 12. An application service server according to the third embodiment of the present invention will be described with reference to FIG. 3.

First, a single sign-on system 10 according to the third embodiment of the present invention may include the terminal 100, the application service servers 200, and the single sign-on service server 300, like the single sign-on system 10 according to the first or second embodiment.

The terminal according to the third embodiment of the present invention activates a web browser in order to operate at least one specific application (hereinafter referred to as an application), and supports selective operation of a plurality of applications through the web browser. In particular, when single sign-on initialization is performed through an integration ID login while a specific application is operated, the single sign-on service system 10 of the present invention may support an automatic login function according to an operation of a single function during an activation of other applications based on the same web browser.

To this end, the terminal 100 may store a web browser and a plurality of applications and support selective operation of the plurality of applications according to activation of the web browser. The terminal 100 may support acquisition of single sign-on cookie information based on the web browser and support operation of a new application without separately inputting login information according to approval of the single sign-on service server 300, using a single sign-on token included in the single sign-on cookie information.

The application service servers 200 according to the third embodiment of the present invention may include a plurality of service servers in order to support a service of each application included in the terminal 100. For example, the application service servers 200 may include the first application service server 201 for supporting the first application of the terminal 100 and also the second application service server 202 for supporting the second application service server 202 for supporting the second application of the terminal 100. These application service servers 200 may check the sign-on information when an access request is received according to activation of a specific application of the terminal 200. In particular, at least one of the application service servers 200 of the present invention may support an automatic login service of the terminal 100 using an integration service number based on a single sign-on token provided by the web browser.

When the application service servers 200 provide a session creation message on the basis of the integration ID information provided by the terminal 100 having the activated specific application, the single sign-on service server 300 according to the third embodiment of the present invention may provide the single sign-on token and a one-time access key to the specific application of the terminal 100 according to the request. Subsequently, the single sign-on service server 300 may provide a single sign-on cookie to the web browser of the terminal 100 that performs access using the one-time access key and may support allocation of the integration service number to an application that requests a session inquiry on the basis of the single sign-on token included in the single sign-on cookie. As a result, the single sign-on service server 300 supports an automatic login function of various applications based on the web browser of the terminal 100.

As described above, the single sign-on service system 10 according to an embodiment of the present invention supports easy access and operation of the application service through the automatic login without repetitively checking the sign-on information by providing the single sign-on token of the single sign-on cookie information, which is issued by the single sign-on service server 300, to the specific application through the web browser when the terminal 100 accesses the application service servers 200 in order to operate the specific application. Respective elements constituting the web browser-based single sign-on service system 10 will be described in more detail with respect to FIGS. 3, 11, and 12.

Figure 11:
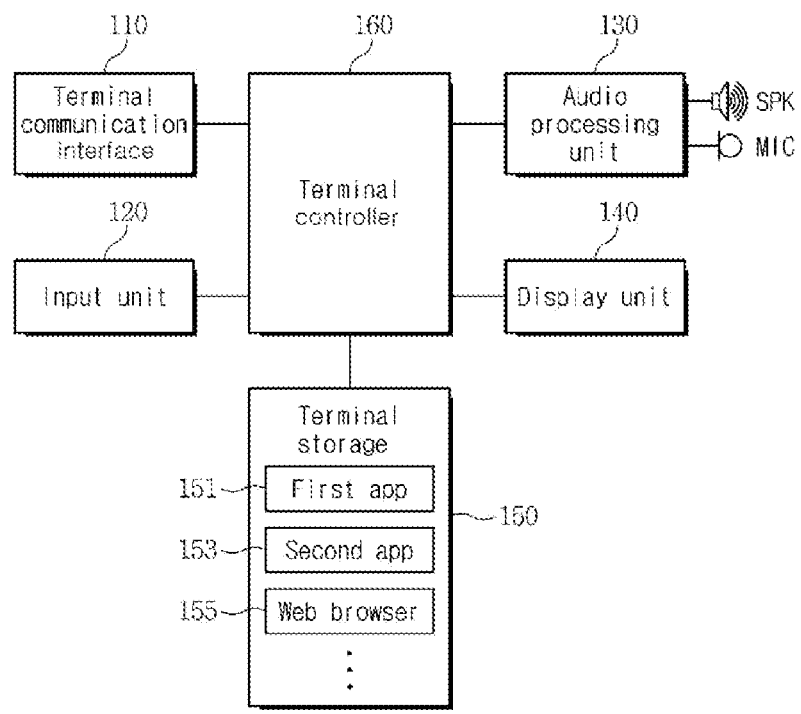
FIG. 11 is a schematic block diagram showing a configuration of a web browser-based terminal according to a third embodiment of the present invention.

First, FIG. 11 is a more detailed block diagram showing a configuration of a terminal according to a third embodiment of the present invention.

Referring to FIG. 11, the terminal 100 according to the third embodiment of the present invention may include a communication interface 110, an input unit 120, an audio processing unit 130, a display unit 140, a storage 150, and a controller 160.

The terminal 100 according to the third embodiment of the present invention may access the first application service server 201 using the communication interface 110 according to a request for activating various applications, for example, a first application 151, on the basis of a web browser 155 stored in the storage 150. In this case, the terminal 100 may initialize operation of the single sign-on service on the basis of the first application 151 in order to operate the single sign-on service. That is, the terminal 100 supports the web browser in acquiring the single sign-on cookie information from the single sign-on service server 300 while operating the first application 151. When a request for activating another application, for example, the second application, is generated, the web browser 155 provides a single sign-on token included in single sign-on cookie information to the second application 153 and supports the automatic login function of the second application service server 202 on the basis of the single sign-on token.

To this end, the communication interface 110 supports a communication function of the terminal 100 to establish a communication channel with the application service servers 200. The communication interface 110 may include a mobile communication module to support mobility of the terminal 100. Thus, the communication interface 110 may access a base station or wireless access point installed to support a communication service and access the application service servers 200 through a network device connected with the base station or wireless access point.

In particular, the communication interface 110 may establish a communication channel with the application service servers 200 to support services of specific applications designated by activating the web browser 155. In this case, when the web browser 155 does not provide the single sign-on token, the communication interface 110 may transmit, for example, to the first application service server 201, a request message for requesting a login using the integration ID information according to a request of a specific application selected for activation, and in response to the transmitted request message, receive a service token, user data, a single sign-on token, and a one-time access key from the first application service server 201.

Here, the single sign-on token and the one-time access key may be provided by the single sign-on service server 300 through the first application service server 201. In addition, the received one-time access key may be provided to the web browser 155. The web browser 155 accesses the single sign-on service server 300 using the communication channel with the single sign-on service server 300 and the one-time access key, and receives single sign-on cookie information from the single sign-on service server 300. The web browser 155 may support an automatic login of applications using the received single sign-on cookie information.

The input unit 120 may support creation of an input signal needed to operate the terminal 100. The input signal may be created with a key button, such as a home key, side key, etc., and output a virtual key map on the display unit 140 implemented with a touch screen. The input unit 120 may create an input signal for activating at least one of the web browser 155 and the applications 151 and 153 supported by the terminal 100. The input signal may be delivered to the controller 160 and used as a command for activating the web browser and the application. Furthermore, the input unit 120 may input the sign-on information required by the application service server according to activation of a specific application.

In particular, the input unit 120 may input the sign-on information for the integration ID login according to a user's control in order to perform the web browser-based single sign-on. After the web browser 155 acquires the single sign-on cookie information, the input unit 120 may create a specific input signal that is predefined and simplified to perform a sign-on on additionally activated applications, for example, an input signal for selecting an automatic login.

The audio processing unit 130 may include a speaker SPK for outputting a variety of audio data generated during an operation of the terminal 100 and a microphone MIC for collecting the audio data. In particular, the audio processing unit 130 may output a variety of audio data generated during activation of the specific applications 151 and 153 and the web browser 155 which are supported by the terminal 100. In this case, the audio processing unit 130 may output a warning announcement sound when incorrect sign-on information is input during activation of a specific application and access to an application service server. When the application service server provides audio data according to activation of a specific application, the audio processing unit 130 may support output of the audio data.

The display unit 140 displays information input by a user or information provided to the user, in addition to all kinds of menus of the terminal 100. That is, the display unit 140 may provide various screens, for example, a standby screen, a menu screen, a message composing screen, a call screen, a terminal completion screen, a terminal booting screen, etc., according to the use of the terminal 100. The display unit 140 may be formed in a flat display panel, such as a liquid crystal display, organic light emitted diode, and so on. The display unit 140 may be manufactured to include a display panel and a touch panel.

In particular, the display unit 140 of the present invention may output a screen for activating the web browser 155 and an application service server access screen for supporting a specific application selected for activation on the web browser 155. In this case, the access screen may be a sign-on information input screen for selecting at least one of access based on the general sign-on information and access based on the integration ID information. The integration ID information may be delivered to the single sign-on service server 300 through a specific application service server. When the single sign-on service server 300 delivers the single sign-on information, that is, the single sign-on token and the one-time access key, the display unit 140 may output a screen for checking reception of the service token, user data, single sign-on token, and one-time access key created by the single sign-on token from the application service server.

When the single sign-on token and the one-time access key are received from the application service server, the application may deliver the one-time access key to the web browser 155, and the web browser 155 may receive the single sign-on cookie information from the single sign-on service server 300 using the one-time access key. The display unit 140 may provide various screens required while the web browser 155 receives single sign-on cookie information and support an automatic login of a specific application using the received single sign-on cookie information. In addition, the display unit 140 may output an indicator or image effect for indicating that the single sign-on has been performed through the web browser 155 to a screen for activating the web browser 155. However, the application of the indicator or image effect may not be provided fixedly to the display unit 140, and may be replaced with output of an automatic login screen when a specific application is selected in the web browser 155. A screen interface provided through the display unit 140 will be described below in more detail with reference to the accompanying drawings.

The storage 150 stores various resources including a screen image to be output to the display unit 140, in addition to application programs necessary for functional operations according to an embodiment of the present invention. In particular, the storage 150 of the present invention may store the various applications 151 and 153 designed to communicate with a specific application service server and provide a specific user function and the web browser 155 provided to select and operate various applications.

The web browser 155 may support a web service of a plurality of applications 151 and 153. The web browser 155 may provide a browser screen having a plurality of applications registered when an activation request is received. When activation of a specific application is selected, the web browser 155 may support calling of the application. In particular, the web browser 155 of the present invention may receive single sign-on cookie information from the single sign-on service server 300 and manage the received single sign-on cookie information to support the single sign-on service. When an input signal for activating a specific application is generated from the input unit 120 or the display unit 140 having an input function, the web browser 155 containing the single sign-on cookie information may call the application and provide a single sign-on token to support a communication service of the application.

At least one of the first application 151 and the second application 153 is an application designed to support a specific user function that can be supported by the terminal 100. In the present invention, the application may be an application that establishes a communication channel with each of the application service servers 200 and provides specific data by checking the automatic sign-on information together with the application service servers 200 on the basis of the single sign-on cookie information according to support of the web browser 155. In particular, the first application 151 and the second application 153 may each be a user function supported by the application service servers that can be managed by one provider or common service provider to support the service on the basis of the single sign-on token.

For example, the first application 151, which is an item provided on the web browser, may support a user function on the basis of communication with the first application service server 201 when selected for activation, and the second application 153, which is an item provided on the web browser, may support a user function on the basis of communication with the second application service server 202 when selected for activation. The first application service server 201 and the second application service server 202 may be integrated and implemented as one device to support a single sign-on service of the first application 151 and the second application 153, such that the single sign-on service server 300 may mange the sign-on information. That is, the first application service server 201 and the second application service server 202 may be the application service servers 200 having sign-on information jointly managed by a specific service provider.

As an exemplary service, the first application 151 may be an application for accessing a web page that is operated by the first application service server 201, and the second application 153 may be an application for accessing a web page that is operated by the second application service server 202. Here, the web page for the first application 151 and the web page for the second application 153 may be web pages having sign-on information that can be integratedly operated by the same provider or predetermined providers.

As another exemplary service, the first application 151 may be a first game application, and the second application 153 may be a second game application. Here, an application service server for supporting the first game application and an application service server for supporting the second game application may be provided by the same service provider, or service providers that can jointly perform account management, and thus may be designed to be integratedly accessible on the basis of the single sign-on token provided by the service provider. Each application service server may also support access by inputting and checking individual sign-on information according to a user's request.

Thus, it can be understood that the first application 151 and the second application 153 of the present invention are not limited a specific web page, a specific game, a specific service page, and so on and may be an application for accessing application service servers designed to perform single sign-on using integration sign-on information. In the above description, the storage 150 has been described as storing two applications, but the present invention is not limited thereto. That is, the storage 150 may store more applications, all of which may be applications associated with application service servers allowing automatic login by using the single sign-on cookie information through the web browser 155.

The controller 160 may control various signal flows, data processing, and data transmission/reception to support a single sign-on service function according to an embodiment of the present invention. For example, the controller 160 may output at least one of a menu, an icon, and a widget to activate at least one of the first application 151, the second application 153, and the web browser 155 stored in the storage 150. Alternatively, the controller 160 may allocate a hot key for activating the first application 151, the second application 153, and the web browser 155 according to a predefined schedule.

When an input signal for activating the web browser 155 is generated, the controller 160 may support output of a plurality of applications 151 and 153, which are supported through the web browser 155, to a screen supporting the web browser 155. When a specific application is selected for activation from among a plurality of applications 151 and 153 included in the web browser 155, the controller 160 may collect application service server address information for supporting the application function, activate the communication interface 110, and control access to the application service server.

In this case, the controller 160 may check whether there is a service token accessible to the application service server, and if there is no service token, control the web browser 155 to provide a single sign-on cookie information-based single sign-on token to the application. Here, when the web browser 155 cannot operate the single sign-on cookie information, the controller 160 may support output of a login screen for accessing the application service server to the display unit 140 in order to support the application function. In addition, the controller 160 may control transmission of the sign-on information for the integration ID login to operate the single sign-on cookie information according to selection of the user. When the web browser 155 can operate the single sign-on cookie information, the controller 160 may support an automatic login to the application selected for activation by providing the single sign-on token.

That is, the controller 160 of the terminal 100 may support an automatic login function of a plurality of applications provided through the web browser 155 according to whether the web browser 155 operates the single sign-on cookie information. In addition, when the single sign-on cookie information cannot be operated, the controller 160 may process message transmission and data reception such that the web browser 155 may receive the single sign-on cookie information from the single sign-on service server 300.

When an input signal for completing or logging out from a specific application is generated, the controller 160 may control whether only the application service will be released or the single sign-on cookie information will be further removed in addition to the release of the application service. Alternatively, when a specific application service is released, the controller 160 may control termination of only the service token collected to operate the application service, and when an input signal for completing the web browser 155 is generated, the controller 160 may control removal of the single sign-on cookie information.

FIG. 3 is a more detailed block diagram showing a configuration of an application service server 200 according to an embodiment of the present invention. In the description, the application service server 200 may be at least one of the first application service server 201 and the second application service server 202. Thus, the application service server 200 is hereinafter referred to as an application service server and allocated reference number 200 to provide a common description thereof. However, if necessary, each application service server will be described separately.

Referring to FIG. 3, the application service server 200 of the present invention may include a communication interface 210, a first controller 220, and a first storage 230. Additionally, the application service server 200 may further include an input unit, a display unit, etc. to support and manage an application service.

The first communication interface 210 may establish a communication channel with the terminal 100 in order to support a user function according to activation of a specific application of the terminal 100. The first communication interface 210 may receive an access request message composed on the basis of the single sign-on token created by the single sign-on cookie information that is provided by the web browser 155 of the terminal 100 when activating a specific application. Alternatively, the first communication interface 210 may receive an access request for supporting the specific application service from the terminal 100, and receive ID and password information for general sign-on or single sign-on from the terminal 100.

The received message may be delivered to the first controller 220 and then used to perform a sign-on to support the application function of the terminal 100. In particular, if the received message is an integration ID login request message or a single sign-on session inquiry message, the received message may be provided to the single sign-on service server 300. To this end, the first communication interface 210 may establish a communication channel with the single sign-on service server 300. The first communication interface 210 may receive the single sign-on token or integration service number according to processing of the message from the single sign-on service server 300. The received single sign-on token may be provided to the terminal 100, and the received integration service number may be used in an automatic login service for supporting the application function of the terminal 100. Reception and processing of the messages will be described below in more detail with reference to the accompanying drawings.

The first communication interface 210 may include a communication module for establishing a communication channel with the terminal 100 and a communication module for establishing a communication channel with the single sign-on service server 300. Alternatively, the first communication interface 210 may include one communication module for establishing communication channels with the terminal 100 and the single sign-on service server 300. To this end, communication interfaces for accessing the terminal 100 and the single sign-on service server 300 may be implemented to be compatible or the same.

The first storage 230 stores an operating system needed to operate the application service server 200, and various application programs. In particular, the first storage 230 may include an application support program used to support a specific application function of the terminal 100 and store a service token 233 allocated for service use of the terminal 100. In addition, the first storage 230 may store identification information of the terminal 100 through pre-registration of the terminal 100. The identification information of the terminal 100 may be used to check whether the terminal 100 is a registered terminal for normal service use. To this end, the first storage 230 may store the identification information including ID information and password information registered by the terminal 100 according to a predetermined rule.

The application support program 231 may store a sign-on processing routine for checking whether the terminal is a pre-registered terminal according to an access request of the terminal 100, a routine for providing user data corresponding to activation of an application by the signed-on terminal 100, a routine for processing a single sign-on request of the terminal 100, and a routine for allocating the service token in order for the terminal 100 to user the application service.

The single sign-on processing routine may include a routine for performing an integration ID sign-on when the integration ID login request is received from the terminal 100, a routine for requesting the single sign-on service server 300 to create the single sign-on token, and a routine for providing the single sign-on token and the one-time access key to the terminal 100. In addition, the single sign-on processing routine may include a routine for receiving a single sign-on token-based single sign-on session inquiry message from the terminal 100, delivering the single sign-on session inquiry message to the single sign-on service server 300, and receiving an integration service number, and a routine for supporting an automatic login based on the integration service number.

The service token 233 is information that is provided such that a specific application of the terminal 100 may use a service provided by the application service server 200. The service token 233 may be allocated to the terminal 100 when the terminal 100 requests access and the sign-on is performed normally, and returned or discarded when the application service function is completed. The service token 233 may be created in connection with or on the basis of the single sign-on token provided by the single sign-on service server 300 when the terminal 100 requires the single sign-on service.

The first controller 220 may control various signal processing, data processing, and data transmission for operating the application service server 200. When an access request is received from the terminal 100, the first controller 220 may control requesting of the sign-on information of the terminal 100 according to predefined schedule information. When the sign-on information is received from the terminal 100, the first controller 220 may check whether the sign-on information is consistent with pre-registered information, and then provide data needed for the application service function.

Here, when integration ID login information is received from the terminal 100, the first controller 220 performs an integration ID login on the basis of the integration ID login information and provides a single sign-on creation request message to the single sign-on service server 300. In addition, when a single sign-on token and a one-time access key are received from the single sign-on service server 300, the controller 220 may support transmission of the single sign-on token and one-time access key to a specific application of the terminal 100.

When a single sign-on token-based session inquiry message is received from the specific application of the terminal 100, the first controller 220 may control provision of the session inquiry message to the single sign-on service server 300. The first controller 220 may receive the integration service number from the single sign-on service server 300, and support an automatic login service for supporting an application function of the terminal 100 on the basis of the received integration service number. That is, the first controller 220 may perform an integration ID login on the basis of the integration service number, allocate the service token, and then support provision of the service token to the specific application of the terminal 100. That is, the first controller 220 may accept the login and support the application service function without separately checking the sign-on information, according to a check of an application of the terminal 100 that requests access on the basis of the single sign-on token, by the single sign-on service server 300.

Figure 12:
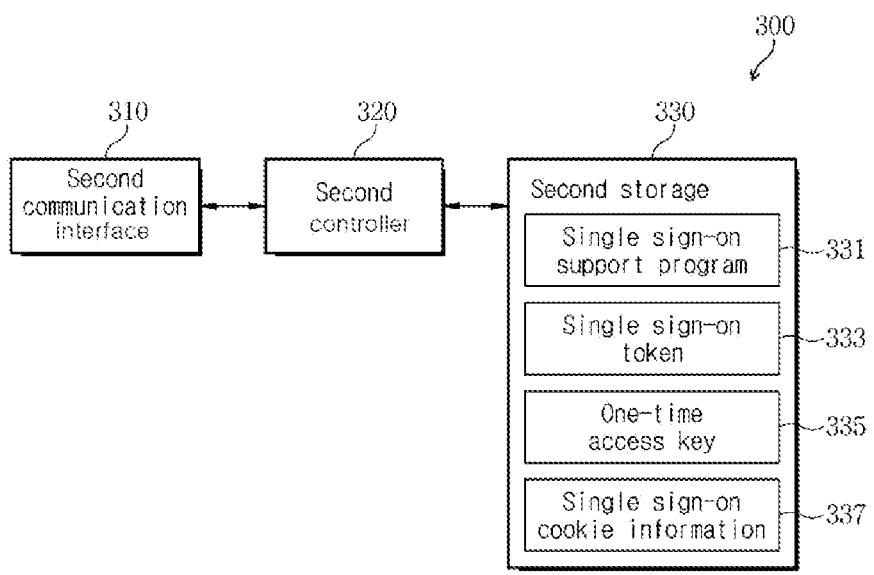
FIG. 12 is a more detailed block diagram showing a configuration of a web browser-based single sign-on service server according to an embodiment of the present invention.

FIG. 12 is a detailed block diagram showing a configuration of a single sign-on service server according to a third embodiment of the present invention.

Referring to FIG. 12, the single sign-on service server 300 of the present invention may include a second communication interface 310, a second controller 320, and a second storage 330. Similarly to the application service server 200, the single sign-on service server 300 may further include an input unit, a display unit, etc. to manage the device or update the specific data.

The second communication interface 310 may establish a communication channel with the application service server 200. To this end, the second communication interface 310 may include a communication module for communicating data with the application service server 200 or a communication module for transmitting data to a network device accessed by the application service server 200 and receiving data from the network device. The second communication interface 310 may receive the single sign-on request message or the single sign-on session inquiry message from the application service server 200. In addition, the second communication interface 310 provides, to the application service server 200, at least one of the single sign-on token, the one-time access key, the single sign-on cookie information, and the integration service number which are created by the second controller 320.

The second storage 330 stores programs for operating the single sign-on service server 300. In particular, the second storage 330 may store a single sign-on support program 331, which is a program for supporting a single sign-on service of the present invention, a single sign-on token 332, a single sign-on token 333, a one-time access key 335, and single sign-on cookie information 337.

The single sign-on support program 331 may support creation of the integration service number or creation of the single sign-on token 333 and the one-time access key 335 according to the message received from the application service server 200. To this end, the single sign-on support program 331 may include a routine for identifying a type of the message received from the application service server 200, a routine for creating an integration service number corresponding to the received message when the received message is a single sign-on session inquiry message, and a routine for providing the created integration service number to the application service server 200. Furthermore, when the received message is a single sign-on request message, the single sign-on support program 331 may include a routine for creating the single sign-on token 333 and the one-time access key 335 and a routine for providing the created single sign-on token 333 and one-time access key 335 to the application service server 200. Also, when access based on the one-time access key 355 is generated, the single sign-on support program 331 may include a routine for creating and transmitting the single sign-on cookie information 337 according to a check of the one-time access key 335.

The single sign-on token 333 and the one-time access key 335 are information for single sign-on token creation of the terminal 100. The single sign-on token 333 and the one-time access key 335 may be created when the terminal 100 requests to use the single sign-on service, transmitted to a specific application of the terminal 100 through the application service server 200, and stored in the second storage 330. The single sign-on token 333 and the one-time access key 335 which are stored in the second storage 330 may be used to check access effectiveness of the application during creation of the single sign-on cookie information. The one-time access key 335 may be deleted after the web browser 155 of the terminal 100 performs access.

The single sign-on cookie information 337 includes a single sign-on cookie and a single sign-on token. The single sign-on cookie information 337 is information that is provided to the web browser 155 performing access on the basis of the one-time access key 335. The single sign-on token included in the single sign-on cookie information 337 may be used to inquire a session inquiry message of the specific application of the terminal 100 later. The single sign-on cookie information 337 may be discarded when the single sign-on service of the terminal 100 is completed, for example, when the web browser 155 is completed.

The second controller 320 may control processing and transmission of various signals needed to operate the single sign-on service server 300. In particular, the second controller 320 may support creation, provision, and management of the single sign-on token 333, the one-time access key 335, and the single sign-on cookie information 337 for the single sign-on service support of the present invention and creation, provision, and management of the single sign-on token-based integration service number. For more detailed description, when the single sign-on request message is received from the application service server 200, the second controller 320 may create the single sign-on token 333 and the one-time access key 335 according to the request. When the single sign-on token 333 and the one-time access key 335 are created, the second controller 320 may provide the created single sign-on token 333 and the one-time access key 335 to the specific application of the terminal 100 through the application service server 200.

When the web browser 155 performs access using the one-time access key 335, the second controller 320 may check effectiveness of the access by the web browser 155 by inquiring the single sign-on token corresponding to the one-time access key 335. Subsequently, the second controller 320 may control creation and transmission of the single sign-on cookie information and deletion of the one-time access key 335.

Here, the second controller 320 may not separately verify the effectiveness because the verification of the effectiveness of the terminal 100 that transmits the single sign-on request message may be performed through the sign-on of integration ID information of the application service server 200. However, the second controller 320 may check whether the terminal 100 is a pre-registered terminal to use the single sign-on service on the basis of information about the terminal 100 included in the single sign-on request message according to a design method of a system designer. To this end, the single sign-on service server 300 may store and manage the information about the terminal 100 which is pre-registered to use the single sign-on service.

When a single sign-on session inquiry message is received from the application service server 200, the second controller 320 checks the single sign-on token included in the inquiry message. In addition, the second controller 320 may check whether the single sign-on token included in the inquiry message is effective on the basis of the pre-stored single sign-on cookie information 337. Here, the effectiveness may be determined considering consistency with the single sign-on cookie information 337 and elapse of a creation time. That is, even if the single sign-on token included in the inquiry message is consistent with the pre-registered single sign-on cookie information 337, the second controller 320 may determine that the single sign-on token loses the effectiveness when a pre-designed threshold time elapses, and then block support of the single sign-on token-based single sign-on service. The design of effectiveness for the single sign-on token may not be applied according to a design method of a system designer. When the single sign-on token of the received inquiry message is effective, the second controller 320 may create the integration service number for supporting use of the application service server and provide the created integration service number to the application service server 200. The integration service number may be used as information that supports acceptance of an automatic login of the terminal 100 desiring to access the application service server 200.

The second controller 320 may receive a message for removing the single sign-on cookie information 337, from the application service server 200. In this case, the second controller 320 may remove the single sign-on cookie information 337 and transmit, to the application service server 200, the fact that the single sign-on cookie information 337 has been removed.

As described above, the single sign-on service system 10 of the present invention and illustrative elements thereof allows the web browser 155 to support the single sign-on service of various applications on the basis of the single sign-on cookie information. Thus, a user may immediately use a necessary service without unnecessarily and repetitively inputting and acquiring the sign-on information during activation of various applications and utilization of the corresponding services on the basis of the web browser 155.

Figure 13:
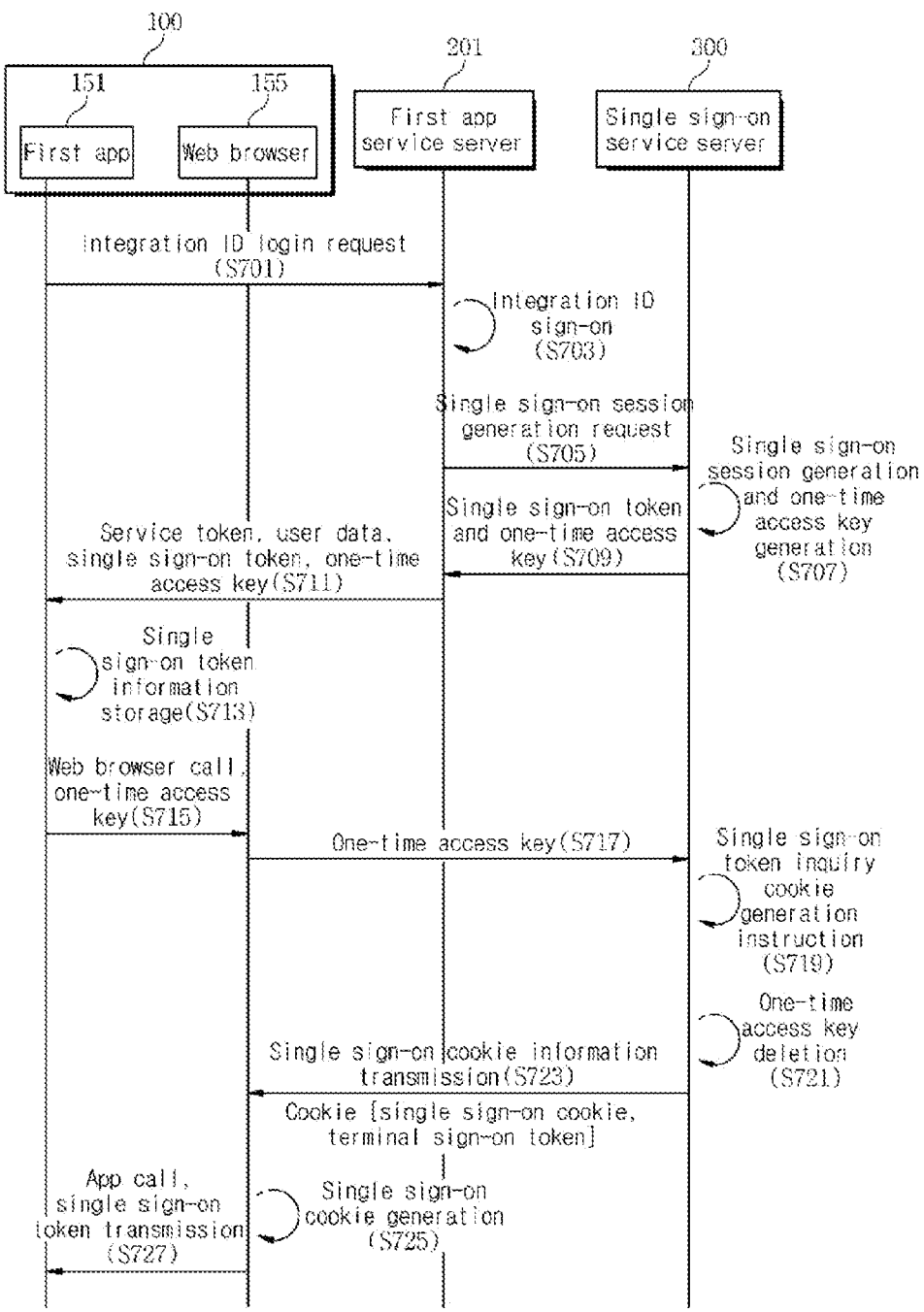
FIG. 13 illustrates a single sign-on initialization process of a web browser-based single sign-on operating method according to a third embodiment of the present invention.

FIG. 13 illustrates a single sign-on cookie creation process of a web browser-based single sign-on service operating method according to a third embodiment of the present invention.

Referring to FIG. 13, in the single sign-on service system operating method, when a user of the terminal 100 activates the web browser 155 stored in the storage 150, the web browser 155 may output a screen for activating a plurality of registered applications to the display unit 140. When the user creates an input signal for activating a specific application, for example, the first application, among the applications registered with the web browser 155, the terminal 100 may check whether there is a service token for supporting the first application 151. Here, the service token may be information for using the first application service server 201 to support a user function of the first application 151. If the terminal 100 has a history of using the first application service server 201, and the terminal 100 is in an effective time period in which a re-access time is predefined or maintains login to the first application service server 201, the terminal 100 may maintain the service token. As a result, if there is the service token, the terminal 100 may access the first application service server 201 on the basis of the history without a separate sign-on.

If there is no service token, but the single sign-on cookie information 337 is operated, the web browser 155 may provide the single sign-on token to the first application 151. Description thereof will be described in more detail with reference to FIG. 13. When the web browser 155 cannot operate the single sign-on cookie information 337, the first application 151 may compose an integration ID login request message to perform a single sign-on and transmit the request message to the first application service server 201 in operation S701. The first application service server 201 may provide data for supporting a user function of the first application 151. When the single sign-on request message is received from the terminal 100, the first application service server 201 may perform an integration ID sign-on by using login information included in the message in operation S703. Subsequently, the first application service server 201 may compose a single sign-on session creation request message (createSSOSessionForMobile) for acquiring the single sign-on token, and transmit the request message to the single sign-on service server 300 in operation S705. Here, the single sign-on session creation request message (createSSOSessionForMobile) may include the integration login information.

When the single sign-on session creation request message createSSOSessionForMobile) is received from the first application service server 201, the single sign-on service server 300 may create a single sign-on (SSO) session in operation S707 according to the reception of the request message. In addition, the single sign-on service server 300 may create a single sign-on token and a one-time access key for operating a single sign-on session, and provide the single sign-on token and the one-time access key to the first application service server 201 in operation S709. Here, the single sign-on service server 300 may store and manage the created single sign-on token and one-time access key in order to examine effectiveness of an access by the web browser 155 later.

When the single sign-on token and the one-time access key are received from the single sign-on service server 300, the first application service server 201 may create a service token for using the first application service server 201 in connection with or on the basis of the single sign-on token, and provide the first application 151 of the terminal 100 with the single sign-on token, one-time access key, service token, and user data according to support of the application service in operation S711. Then, the first application 151 of the terminal 100 may store the single sign-on token information received in S713. When the web browser 155 is deactivated, the first application 151 may call the web browser 155 and provide the one-time access key 335 to the web browser 155 in operation S715. Here, when the web browser 155 is activated, the first application 151 may provide the one-time access key 335 to the web browser 155. In this case, it is assumed that a user activates the first application 151 without calling the web browser 155 and accesses the first application service server 201.

When the one-time access key is received from the first application 151, the web browser 155 may access the single sign-on service server 300 on the basis of the one-time access key. In this case, the web browser 155 may directly access the single sign-on service server 300 not via the first application service server 201. If the web browser 155 accesses the single sign-on service server 300 via the first application service server 201, the first application service server 201 may support relay of the data between the web browser 155 and the single sign-on service server 300.

When one-time access key-based access is received from the web browser 155 of the terminal 100, the single sign-on service server 300 may control inquiry of the single sign-on token on the basis of the one-time access key and creation of cookie information on the basis of the single sign-on token in operation S719. Then, the single sign-on service server 300 may delete the one-time access key in operation S721. The single sign-on service server 300 may provide the created single sign-on cookie information to the web browser 155 of the terminal 100 in operation S723. Here, the cookie information may include a single sign-on cookie (SSO Cookie) and a single sign-on token (Mobile SSO Token).

When the single sign-on token information is received, the web browser 155 may create the single sign-on cookie on the basis of the received single sign-on token information in operation S725, and may call a selected specific application, for example, the first application 151, and deliver the single sign-on token to the first application 151 in operation 727.

Figure 14:
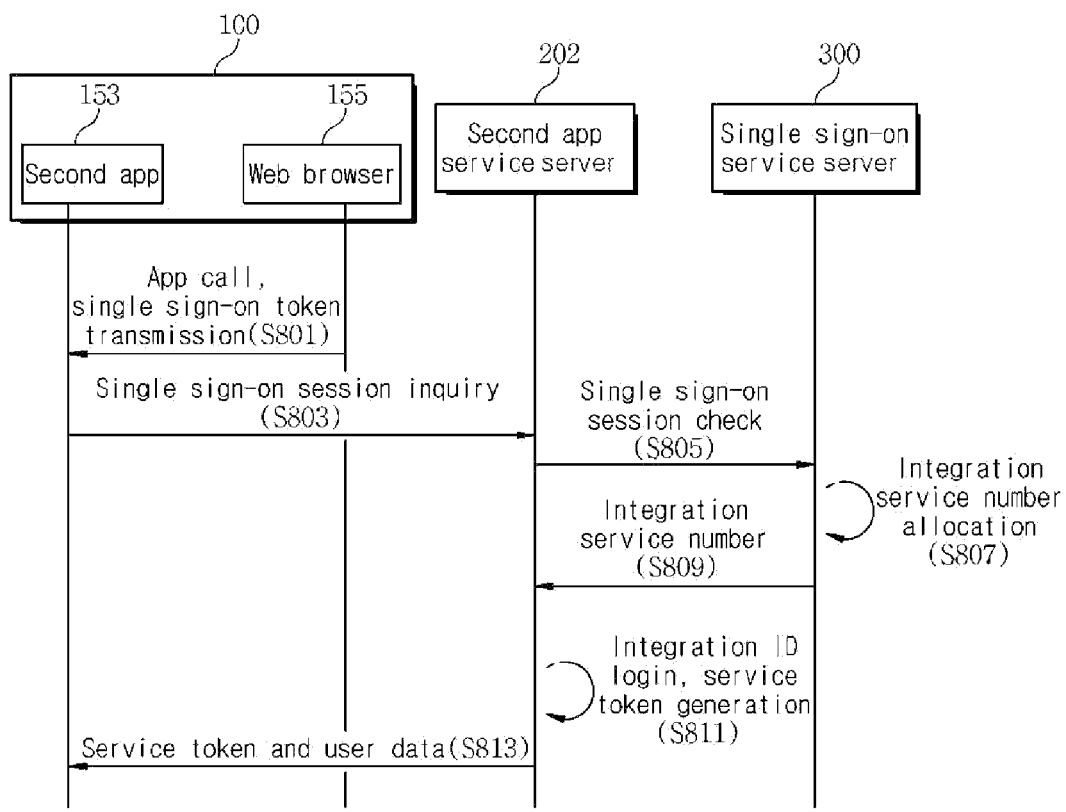
FIG. 14 illustrates a single sign-on operating process of the web browser-based single sign-on operating method according to the third embodiment of the present invention.

FIG. 14 illustrates a single sign-on token operating process of a web browser-based single sign-on service operating method according to a third embodiment of the present invention.

Referring to FIG. 14, in a method of operating the single sign-on service system 10 of the present invention, when an input signal for activating a specific application, for example, the second application 153, is received while the web browser 155 is activated, the web browser 155 may call the second application 153 and provide the single sign-on token to the second application 153 in operation S801. Then, the second application 153 may compose a single sign-on session inquiry message on the basis of the single sign-on token and deliver the single sign-on session inquiry message to the second application service server 202 in operation S803.

The second application service server 202 composes a single sign-on session check message (checkSSOSessionForMobile) in response to the reception of the single sign-on session inquiry message, and delivers the single sign-on session check message (checkSSOSessionForMobile) to the single sign-on service server 300 in operation S805. When the single sign-on session check message (checkSSOSessionForMobile) is received from the second application service server 202, the single sign-on service server 300 may allocate an integration service number on the basis of information, for example, a single sign-on token included in the single sign-on session check message (checkSSOSessionForMobile) in operation S807.

Then integration service number may be delivered to the second application service server 202 in operation S809. Then, the second application service server 202 performs an integration ID login on the basis of the received integration service number and creates a service token for using the second application service server 202 in operation S811. The created service token, and user data for operating the second application service server 202 may be provided to the second application 153 of the terminal 100.

As described above, according to the web browser-based single sign-on service operating method of the present invention, the web browser may allocate the single sign-on token to the application to be activated on the basis of the single sign-on cookie, thereby supporting provision of an automatic login service during access to the specific application service server.

Figure 15:
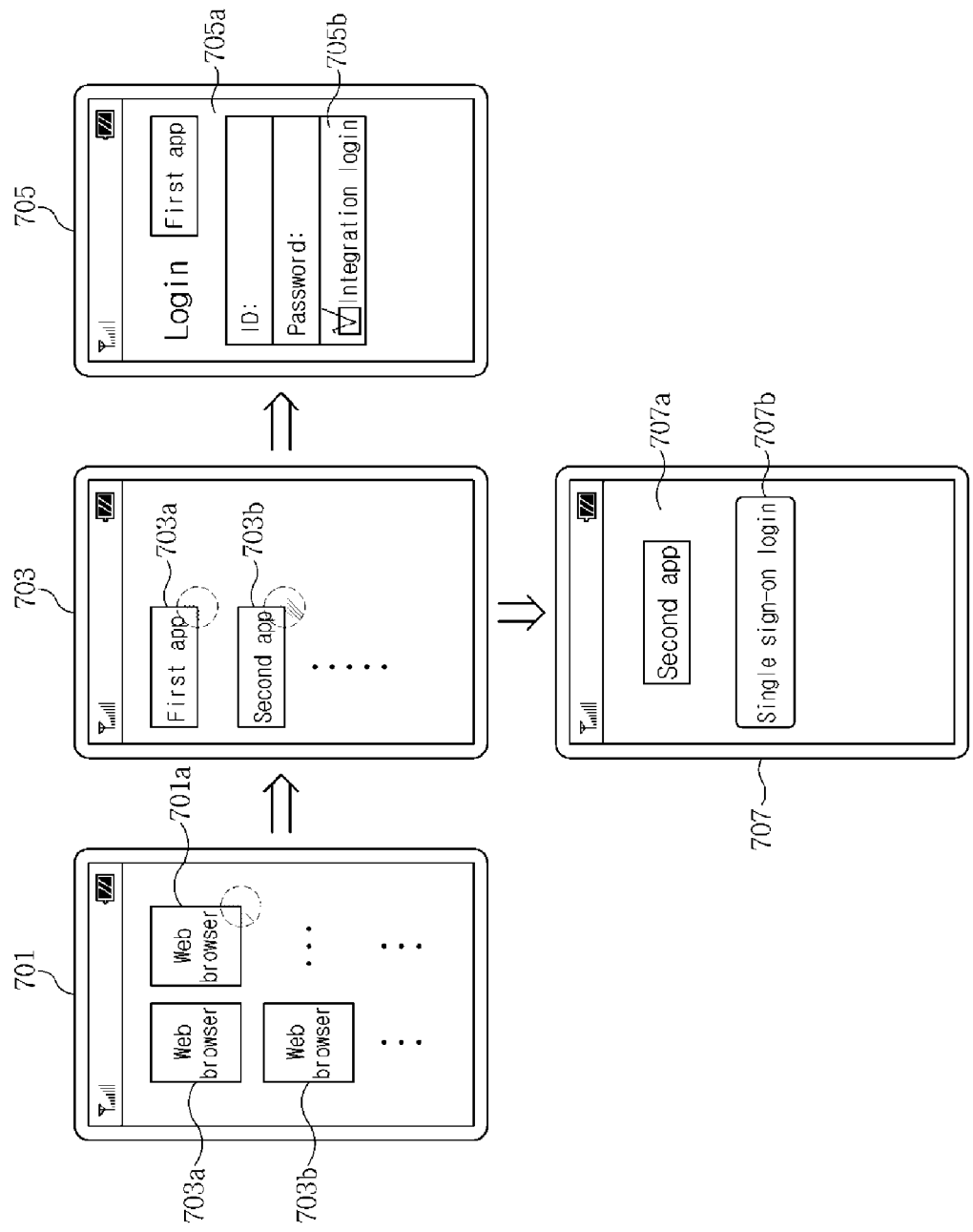
FIG. 15 schematically illustrates an example of a screen interface of a terminal on the basis of a single sign-on function operation according to the third embodiment of the present invention.

FIG. 15 illustrates a terminal screen interface of a web browser-based single sign-on service operating method according to a third embodiment of the present invention.

Referring to FIG. 15, the terminal 100 may output a screen 701 for selecting a web browser item 701a to the display unit 140 according to predetermined schedule information or a user input when power is supplied. Only the web browser item 701a is displayed as shown in FIG. 5. However, additional application items for operating various functions supported by the terminal 100 may be displayed according to a user's setting. For example, the terminal 100 may output application items for supporting direct execution of the first application 703a or the second application 703b to the display unit 140.

When a user selects the web browser item 701a, the terminal 100 may output a screen 703 for selecting a plurality of application items 703a and 703b. Two application items 703a and 703b are displayed as shown in FIG. 5. However, the number of application items may increase or decrease depending on a setting of a user or support of a terminal.

When a user selects the first application item 703a, the terminal 100 may control access to the first application service server 201 for supporting the first application item 703a. Then, when the web browser 155 cannot provide the single sign-on token for the above-described single sign-on service, the terminal may output the first application login screen 705a for accessing the first application service server 201 to the display unit 140. Then a user may input an ID and a password through the first application login screen 705a. In particular, the user may select an integration login item 705b through the first application login screen 705a and input the pre-registered integration ID and password in order for the web browser 155 to create and operate a single sign-on cookie. When the integration login item 705b is selected, the terminal 100 may compose an integration ID login request message on the basis of the input ID and password information and transmit the request message to the first application service server 201. Subsequently, the terminal 100 may support acquisition by the web browser 155 of the single sign-on cookie information according to the above-described procedure. When the integration login item 705b is not selected, the first application 151 may support only sign-on to the first application service server 201 by transmitting and receiving general sign-on information.

On the assumption of the screen 703 in which the web browser 155 of the terminal 100 may operate the single sign-on cookie information 337, when the second application item 703b is selected, the web browser 155 may call the second application 153 and also provide the single sign-on token to the second application 153. Then, the second application 153 transmits a single sign-on token-based session inquiry message to the single sign-on service server 300 through the second application service server 202 during access to the second application service server 202. The second application service server 202 may receive the integration service number from the single sign-on service server 300 and control the integration ID login to the second application 153. In this case, the second application service server 202 may inquire of the second application 153 of the terminal 100 whether to execute the integration ID login, and the terminal 100 may output the second application login screen 707a including the single sign-on login item 707b in the screen 707. A user may perform automatic login to the second application service server 202 for supporting the second application 153 by selecting the single sign-on login item 707b.

When an input signal for logging out or completing a specific application is generated, the terminal 100 may transmit a service token termination request message for logging out or completing the application to the application service server. In addition, when a service token termination response message is received from the application service server, the terminal 100 may control logout from the service. In addition, when an input signal for completing the web browser 155 or logging out from the single sign-on service based on the web browser 155 is generated, the terminal 100 may transmit a service token termination and single sign-on cookie termination request message corresponding to the input signal to the application service server and the single sign-on service server 300. When a service token termination and single sign-on cookie termination response message is received from the application service server and the single sign-on service server 300, the terminal 100 may log out of the service. The single sign-on service server 300 may provide a response message in response to reception of the single sign-on cookie termination request message and delete the stored single sign-on cookie information.

As described above, in the single sign-on service system and method of the present invention and a screen interface therefor, the single sign-on token and the service token for operating the application service server may be operated to remove the need to repetitively input sign-on information on various applications and facilitate management of the sign-on information. In addition, the present invention may allow access to the application service server with the single sign-on token to execute access of the various applications, thereby minimizing re-input of the sign-on information and inquiry of the ID and password.

The terminal 100 may further include a variety of additional modules according to the provision method. That is, if the terminal 100 is a communication terminal, the terminal 100 may further include a near field communication module, a wired or wireless data communication interface, an Internet communication module for performing an Internet function over an Internet network, and a digital broadcasting module for receiving and reproducing digital broadcasting, which have not been described above. The above elements may be variously modified in response to convergence trends of digital devices. Thus, although it is impossible to list all of the elements, elements similar to the above elements may be further included in the device. It should be understood by those skilled in the art that some elements of the terminal 100 of the present invention may be removed or replaced with other elements according to the provision method thereof.

The terminal 200 according to an embodiment of the present invention may include all kinds of devices that can use an application service server-based application function. For example, the terminal 100 may include all kinds of information communication devices, multimedia devices, and application devices thereof, such as a portable multimedia player (PMP), a digital broadcasting player, a personal digital assistant (PDA), a music player (for example, an MP3 player), a portable game console, a smart phone, a note book, and a handheld PC, in addition to mobile communication terminals operated according to communication protocols corresponding to various communication systems.

Also, the single sign-on service operating method of the present invention may be implemented with software that is readable through a variety of computer means including an application service server or terminal, and recorded in a recording medium. In this case, a program recorded in the recording medium may be implemented to execute one or more processes or functions of the single sign-on service operating method of the present invention. Here, the recording medium may include a program instruction, a data file, a data structure, or a combination thereof. The program instruction recorded in the recording medium may be designed and configured specifically for the present invention or may be publicly known and available to those skilled in the art. Examples of the recording medium include a magnetic medium such as a hard disk, a floppy disk, and a magnetic tape, an optical medium such as a compact disk read only memory (CD-ROM) and a digital video disk (DVD), a magneto-optical medium such as a floptical disk, and a hardware device specially configured to store and perform the program instruction, such as a read only memory (ROM), a random access memory (RAM), a flash memory, etc. Examples of the program instruction include a high-level language code executable by a computer with an interpreter, in addition to a machine language code made by a compiler. The above exemplary hardware device can be configured to operate as one or more software modules in order to perform the operations of the present invention, and vice versa.

While preferred embodiments of the present invention have been described using specific terms, such description is for illustrative purposes only, and it is to be understood that changes and variations may be made without departing from the spirit or scope of the following claims. Although specific embodiments have been illustrated and described herein, it is obvious to those skilled in the art that many modifications of the present invention may be made without departing from what is intended to be limited solely by the appended claims.

INDUSTRIAL APPLICABILITY

The single sign-on service system and method of the present invention can facilitate a sign-on needed to operate various applications with one-time input for operating a specific application and can support easy sign-on management. In addition, the present invention may support use of various applications provided by a specific service provider on the basis of single sign-on information, thereby saving cost and improving efficiency of managing the sign-on information while increasing transparency and reliability of management of the sign-on information.

That is, the present invention may be applied to a sign-on needed to operate various applications installed in the terminal device, thereby saving sign-on cost and improving efficiency. Accordingly, the present invention is industrially applicable.

The invention claimed is:
1. A single sign-on service system, comprising:
 a terminal that
  accesses at least one of a plurality of application service servers according to a request for activating at least one of a plurality of applications, and
  receives a service token used to operate the application service from each application service server on the basis of a single sign-on token without separately inputting sign-on information;
 an application service server that
  provides data for operating the application service by the terminal having the service token, when a single sign-on message is received from the terminal,
  provides the single sign-on message to a single sign-on service server, when an integration service number is received from the single sign-on service server,
  creates the service token on the basis of the single sign-on token without separately checking sign-on information, and
  provides the created service token and the data for operating the application service by the terminal to the terminal; and
 the single sign-on service server that
  provides the single sign-on token to the terminal through the application service server when the single sign-on message received from the application service server is a single sign-on session request message, and provides the integration service to the application service server when the single sign-on message received from the application service server is a single sign-on session examination message.

2. An application service server capable of supporting a single sign-on service, the application service server comprising:
 a first communication interface that receives integration ID login information or a single sign-on token-based session inquiry message from a specific application of a terminal;
 a first storage that stores data for supporting a specific application function of the terminal and a service token for operating the specific application function of the terminal; and
 a first controller that delivers a message for creating a single sign-on token to a single sign-on service server when the integration ID login information is received from the specific application, and when the session inquiry message is received, transmits the session inquiry message to the single sign-on service server, receives an integration service number associated with the session inquiry message from the single sign-on service server, creates the service token on the basis of the single sign-on token without separately checking sign-on information of the application, and then provides the service token to the specific application of the terminal.

3. The application service server of claim 2, wherein the first controller controls delivery of a message corresponding to the integration ID login information or a message corresponding to the session inquiry message to the single sign-on service server, and
 when a single sign-on token and a one-time access key for acquiring single sign-on cookie information by the web browser are received from the single sign-on service server, the first controller controls delivery of the single sign-on token and the one-time access key to the application of the terminal.

4. The application service server of claim 2, wherein, when the integration ID login information is received, the first controller controls creation of the service token on the basis of the single sign-on token provided by the single sign-on service server and provision of the single sign-on token, the service token, and the application function support data to the specific application of the terminal.

5. The application service server of claim 2, wherein,
when the integration ID login information is received, the first controller controls creation of the service token on the basis of the single sign-on token provided by the single sign-on service server and provision of the single sign-on token, a one-time access key, the service token, and the application function support data to the specific application of the terminal, and
when the session inquiry message is received, the first controller controls creation of the service token on the basis of the integration service token provided by the single sign-on service server and provision of the service token to the specific application of the terminal.

6. The application service server of claim 2, wherein, when a service token termination request message is received from the specific application of the terminal, the first controller controls provision of a service token termination response message for logging out of the application service to the terminal.

7. The application service server of claim 2, wherein,
when the service token and a single sign-on token termination request message is received from the specific application of the terminal, the first controller controls provision of the token termination request message to the single sign-on service server, and
when a response message corresponding to the token termination request message is received, the first controller controls provision of the service token and the single sign-on token termination response message to the terminal.

8. The application service server of claim 2, wherein, when a web browser completion or web browser-based single sign-on cookie termination request message is received, the first controller controls provision of the web browser completion or web browser-based single sign-on cookie termination request message to the single sign-on service server and provision of a response message corresponding to the request message to the terminal.

9. A single sign-on service server, comprising:
a first communication interface that establishes a communication channel with at least one application service server and receives a single sign-on session request message and a single sign-on session examination message transmitted by a specific application of a terminal through the application service server;
a first storage that stores a single sign-on token provided to the terminal to support a single sign-on allowing access to a specific application service server without separately inputting sign-on information; and
a first controller that controls provision of the single sign-on token to the terminal through the application service server when the single sign-on session request message is received and provision of a single sign-on token-based integration service number to the application service server when the single sign-on session examination message is received.

10. The single sign-on service server of claim 9, wherein, when a single sign-on token termination request message is received from the application service server, the first controller controls provision of a response message corresponding to the single sign-on token termination to the application service server.

11. The single sign-on service server of claim 9, wherein, when a single sign-on session request message is received for creating single sign-on cookie information to be provided to a web browser of the terminal, the first controller controls provision of a single sign-on token and a one-time access key corresponding to the single sign-on session request message to the terminal through the application service, and provision of the single sign-on cookie information to the web browser performing access through the one-time access key.

12. The single sign-on service server of claim 11, wherein the first controller controls deletion of the one-time access key after the web browser performs access on the basis of the one-time access key.

13. The single sign-on service server of claim 11, wherein,
when an application single sign-on message composed by using single sign-on cookie information provided by the web browser of the terminal is received, the first controller controls provision of an integration service number corresponding to the application single sign-on message to the application service server, and
when a single sign-on cookie termination message is received from the web browser of the terminal, the first controller controls provision of a response message corresponding to the single sign-on cookie termination request message to the web browser and deletion of the single sign-on cookie information stored in the first storage.

* * * * *